US012786710B2

(12) United States Patent
Karapantelakis et al.

(10) Patent No.: US 12,786,710 B2
(45) Date of Patent: Nov. 3, 2026

(54) DEVICE AUTHENTICATION IN A COMMUNICATION NETWORK

(71) Applicant: Telefonaktiebolaget LM Ericsson (publ), Stockholm (SE)

(72) Inventors: Athanasios Karapantelakis, Solna (SE); Yifei Jin, Solna (SE); Lackis Eleftheriadis, Valbo (SE); Alexandros Nikou, Stockholm (SE); Marin Orlic, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 872 days.

(21) Appl. No.: 17/917,576

(22) PCT Filed: Apr. 8, 2020

(86) PCT No.: PCT/EP2020/060070

§ 371 (c)(1), (2) Date: Oct. 7, 2022

(87) PCT Pub. No.: WO2021/204381

PCT Pub. Date: Oct. 14, 2021

(65) Prior Publication Data

US 2023/0171597 A1 Jun. 1, 2023

(51) Int. Cl.
*H04W 12/069* (2021.01)
*H04W 12/03* (2021.01)
*H04W 12/69* (2021.01)

(52) U.S. Cl.
CPC ......... *H04W 12/069* (2021.01); *H04W 12/03* (2021.01); *H04W 12/69* (2021.01)

(58) Field of Classification Search
CPC ............................ H04W 12/03; H04W 12/069
See application file for complete search history.

(56) References Cited

U.S. PATENT DOCUMENTS 10,194,320 B1 1/2019 Egner et al.
2016/0212099 A1 7/2016 Zou et al.
(Continued)

FOREIGN PATENT DOCUMENTS

WO 2017/082966 A1 5/2017
WO 2019/175868 A1 9/2019
WO 2019/209149 A1 10/2019

OTHER PUBLICATIONS

International Search Report and Written Opinion of the International Searching Authority, PCT/EP2020/060070 mailed Nov. 30, 2020, 12 pages.
(Continued)

*Primary Examiner* — Barry W Taylor
(74) *Attorney, Agent, or Firm* — Sage Patent Group

(57) ABSTRACT

According to an aspect, there is provided a method of operating an analysis node. The method comprises receiving, from a network node in a first communication network to which a first wireless device is attached, behaviour information relating to the behaviour of the first wireless device with respect to the first communication network during a time period following attachment of the first wireless device to the first communication network; analysing the received behaviour information with reference to predetermined behaviour information for wireless devices owned by one or more third parties to determine whether the first wireless device is owned by one of the third parties; and sending an indication of whether the first wireless device is to be authenticated in the first communication network, wherein the indication is based on whether the first wireless device is determined to be owned by one of the third parties.

20 Claims, 14 Drawing Sheets

(56) References Cited

U.S. PATENT DOCUMENTS

| | | | | |
|---|---|---|---|---|
| 2018/0176768 | A1* | 6/2018 | Baek | H04W 8/205 |
| 2019/0081961 | A1* | 3/2019 | Bansal | H04L 67/10 |
| 2019/0090286 | A1* | 3/2019 | Vandikas | H04W 76/10 |
| 2020/0021973 | A1* | 1/2020 | Anslot | H04W 8/265 |
| 2020/0245128 | A1* | 7/2020 | Obaidi | H04W 8/183 |
| 2021/0006583 | A1* | 1/2021 | Ryabenkiy | H04L 9/3239 |
| 2023/0091179 | A1* | 3/2023 | Bari | H04L 9/0825 713/168 |

OTHER PUBLICATIONS

3GPP Draft, "5G End-to-End Architecture Francework", Nov. 10, 2019, pp. 1-70, S6-192010 V.3.0.8, 70 pages.

3GPP TR 36.746 V15.1.1 (Apr. 2018) "Study on further enhancements to LTE Device to Device (D2D), User Equipment (UE) to network relays for Internet of Things (IoT) and wearables (Release 15)", 55 pages.

International Mobile Subscriber Identity (IMSI) Assignment and Management Guidelines and Procedures, Aug. 2018, V15.1.1, 43 pages.

M. Simsek et al., "Device-to-Device Discovery based on 3GPP System Level Simulations", IEEE 2013 Globecom Workshops—International Workshop on Device-to-Device (D2D) Communication With and Without Infrastructure, 2013, 6 pages.

S-Y. Lien et al., "3GPP Device-to-Device Communications for Beyond 4G Cellular Networks", IEEE Communications Magazine, Mar. 2016, vol. 54, Issue 3, 8 pages.

W. John et al., "Detection of malicious Traffic on Backbone Links via Packet Header Analysis", Campus-Wide Information Systems, Nov. 2008, vol. 25, Issue No. 5., 15 pages.

* cited by examiner

DEVICE AUTHENTICATION IN A COMMUNICATION NETWORK

CROSS REFERENCE TO RELATED APPLICATIONS

This application is a 35 U.S.C. § 371 national stage application of PCT International Application No. PCT/EP2020/060070 filed on Apr. 8, 2020, the disclosure and content of which is incorporated by reference herein in its entirety.

TECHNICAL FIELD OF THE INVENTION

This disclosure relates to apparatus and methods for use in communication networks, and in particular to methods and apparatus for enabling wireless devices to be authenticated in a communication network.

BACKGROUND OF THE INVENTION

In Third Generation Partnership Project (3GPP) mobile networks, a device needs to be authenticated to the mobile network on attachment to the network before it can use any of the network's services (for example, mobile broadband, voice or messaging). In current Third Generation (3G) and Fourth Generation (4G) networks, the call flow for the access registration process is similar and follows a challenge-based authentication approach. The core network stores an International Mobile Subscriber Identity (IMSI) and a respective encryption key for a subscriber in its subscription database, for example a Home Location Register (HLR) and Home Subscriber Server (HSS) in 3G and 4G respectively. On the other hand, the mobile device (also known as a wireless device or User Equipment (UE)) has the corresponding IMSI and encryption key stored in its Subscription Identity Module (SIM). The SIM can be a physical card, or it can be imprinted on a chip (e.g. a Soft SIM/embedded-Universal Integrated Circuit Card (eUICC)) or even embedded in software, for example using Intel's integrated Universal Integrated Circuit Card (iUICC). The authentication process includes the core network of the Mobile Network Operator (MNO) generating a random message, encrypting it with the key stored in the subscription database and sending it to the UE. The UE decrypts it using the key stored in its SIM and sends the decrypted message back to the core network for verification. If the decrypted message matches the message originally generated, then the UE is authenticated. The process is similar for Fifth Generation (5G) networks (also referred to as New Radio (NR)), although the network nodes in a 5G-NR network have different names.

SUMMARY OF THE INVENTION

Existing 3GPP networks are not designed for massive UE onboarding (i.e. large numbers of new subscribers being created and deployed in a mobile network in a short space of time). However, with increasing Machine to Machine (M2M) communication and the growth of the Internet of Things (IoT), there could be a need from enterprise (e.g. business) customers of mobile networks to massively onboard devices for their particular enterprise-specific applications. Examples include automotive manufacturers producing millions of vehicles per year on a global scale, smart home product manufacturers producing hundreds of millions of electrical devices, etc. In the state of the art, a prior communication between the MNO providing connectivity services and the enterprise customer is needed so that the enterprise customer obtains access to subscriber identity modules of the MNO. This feedback loop takes some time, requires human interaction, and incurs cost for both parties. An additional feedback loop is that MNOs have to procure IMSI ranges from a country regulator before IMSIs can be assigned to enterprise (and other) customers.

In WO 2019/209149 a method is disclosed for facilitating administration of subscription identifiers for use in a wireless communication network. This can be achieved by using a permissioned distributed database (e.g. a permissioned blockchain) that is distributed at least in part between a wireless communication network operator and a regulator that regulates subscription identifier administration. The distributed database may have a multi-tier structure that enables the operator to delegate subscriber identifier administration to other parties, e.g. to enterprises.

However, the issue of a device having to authenticate, for example having to store in its volatile or non-volatile memory (or an external physical medium) information such as an IMSI and encryption key, leads to additional costs, both in procuring and integrating this module into the device, and these costs arise regardless of whether the integration is done using software or dedicated hardware chip/card.

Therefore, there is a need for alternative ways to enable wireless devices to be enrolled in a communication network, in particular by an enterprise that may manufacture a large number of devices that can be used in the communication network.

Certain aspects of the present disclosure and their embodiments may provide solutions to the above or other challenges. In particular apparatus and methods are provided that generally allow for wireless devices without IMSIs to temporarily attach to a communication network. In certain embodiments, once attached to the communication network the behaviour of the wireless device is observed, and the observed behaviour can be used to determine whether the wireless device can be admitted as a subscriber to the communication network and/or to identify an owner of the wireless device (e.g. an enterprise).

According to a first aspect, there is provided a method of operating an analysis node. The method comprises receiving, from a network node in a first communication network to which a first wireless device is attached, behaviour information relating to the behaviour of the first wireless device with respect to the first communication network during a time period following attachment of the first wireless device to the first communication network. The method further comprises analysing the received behaviour information for the first wireless device with reference to predetermined behaviour information for wireless devices owned by one or more third parties to determine whether the first wireless device is owned by one of the third parties. The method further comprises sending, to a network node in the communication network, an indication of whether the first wireless device is to be authenticated in the first communication network, wherein the indication is based on whether the first wireless device is determined to be owned by one of the third parties.

According to a second aspect, there is provided a method of operating a subscriber information storage node in a first communication network. The method comprises storing a first distributed ledger that comprises wireless device information for a plurality of wireless devices, wherein the wireless device information comprises respective unique device identifiers and authentication information for the plurality of wireless devices. The method further comprises receiving, from an analysis node, an add request that comprises information that is to be stored by the subscriber information storage node in the first distributed ledger or in a second distributed ledger, wherein the information in the add request comprises one or both of behaviour information for a first wireless device in a time period following attachment to the first communication network, and an indication of whether the first wireless device is to be authenticated in the first communication network. The method further comprises adding the information received from the analysis node to the first distributed ledger or the second distributed ledger.

According to a third aspect, there is provided a method of operating a mobility management node in a first communication network. The method comprises attaching a first wireless device to the first communication network via a first packet gateway in the first communication network for a time period. The method further comprises receiving, from an analysis node, an indication of whether the first wireless device is to be authenticated in the first communication network, wherein the indication indicates either that the first wireless device is to be reattached to a different packet gateway in the first communication network or the first wireless device is to be detached from the first communication network.

According to a fourth aspect, there is provided a computer program product comprising a computer readable medium having computer readable code embodied therein, the computer readable code being configured such that, on execution by a suitable computer or processor, the computer or processor is caused to perform the method of any of the first aspect, the second aspect, the third aspect, or any embodiment thereof.

According to a fifth aspect, there is provided an analysis node. The analysis node is configured to receive, from a network node in a first communication network to which a first wireless device is attached, behaviour information relating to the behaviour of the first wireless device with respect to the first communication network during a time period following attachment of the first wireless device to the first communication network. The analysis node is further configured to analyse the received behaviour information for the first wireless device with reference to predetermined behaviour information for wireless devices owned by one or more third parties to determine whether the first wireless device is owned by one of the third parties. The analysis node is further configured to send, to a network node in the communication network, an indication of whether the first wireless device is to be authenticated in the first communication network, wherein the indication is based on whether the first wireless device is determined to be owned by one of the third parties.

According to a sixth aspect, there is provided a subscriber information storage node for use in a first communication network. The subscriber information storage node is configured to store a first distributed ledger that comprises wireless device information for a plurality of wireless devices, wherein the wireless device information comprises respective unique device identifiers and authentication information for the plurality of wireless devices. The subscriber information storage node is further configured to receive, from an analysis node, an add request that comprises information that is to be stored by the subscriber information storage node in the first distributed ledger or in a second distributed ledger, wherein the information in the add request comprises one or both of behaviour information for a first wireless device in a time period following attachment to the first communication network, and an indication of whether the first wireless device is to be authenticated in the first communication network. The subscriber information storage node is further configured to add the information received from the analysis node to the first distributed ledger or the second distributed ledger.

According to a seventh aspect, there is provided a mobility management node for use in a first communication network. The mobility management node is configured to attach a first wireless device to the first communication network via a first packet gateway in the first communication network for a time period. The mobility management node is further configured to receive, from an analysis node, an indication of whether the first wireless device is to be authenticated in the first communication network, wherein the indication indicates either that the first wireless device is to be reattached to a different packet gateway in the first communication network or the first wireless device is to be detached from the first communication network.

According to an eighth aspect, there is provided an analysis node. The analysis node comprises a processor and a memory. The memory contains instructions executable by said processor whereby said analysis node is operative to receive, from a network node in a first communication network to which a first wireless device is attached, behaviour information relating to the behaviour of the first wireless device with respect to the first communication network during a time period following attachment of the first wireless device to the first communication network; analyse the received behaviour information for the first wireless device with reference to predetermined behaviour information for wireless devices owned by one or more third parties to determine whether the first wireless device is owned by one of the third parties; and send, to a network node in the communication network, an indication of whether the first wireless device is to be authenticated in the first communication network, wherein the indication is based on whether the first wireless device is determined to be owned by one of the third parties.

According to a ninth aspect, there is provided a subscriber information storage node for use in a first communication network. The subscriber information storage node comprises a processor and a memory. The memory contains instructions executable by said processor whereby said subscriber information storage node is operative to store a first distributed ledger that comprises wireless device information for a plurality of wireless devices, wherein the wireless device information comprises respective unique device identifiers and authentication information for the plurality of wireless devices; receive, from an analysis node, an add request that comprises information that is to be stored by the subscriber information storage node in the first distributed ledger or in a second distributed ledger, wherein the information in the add request comprises one or both of behaviour information for a first wireless device in a time period following attachment to the first communication network, and an indication of whether the first wireless device is to be authenticated in the first communication network; and add the information received from the analysis node to the first distributed ledger or the second distributed ledger.

According to a tenth aspect, there is provided a mobility management node for use in a first communication network. The mobility management node comprises a processor and a memory. The memory contains instructions executable by said processor whereby said mobility management node is operative to attach a first wireless device to the first communication network via a first packet gateway in the first communication network for a time period; and receive, from an analysis node, an indication of whether the first wireless device is to be authenticated in the first communication network, wherein the indication indicates either that the first wireless device is to be reattached to a different packet gateway in the first communication network or the first wireless device is to be detached from the first communication network.

According to an eleventh aspect, there is provided a system comprising two or more of: an analysis node according to the fifth aspect, the eighth aspect or any embodiments thereof; a subscriber information storage node according to the sixth aspect, the ninth aspect or any embodiments thereof; and a mobility management node according to the seventh aspect, the tenth aspect or any embodiments thereof.

BRIEF DESCRIPTION OF THE DRAWINGS

Various embodiments are described herein with reference to the following drawings, in which.

DETAILED DESCRIPTION OF THE PREFERRED EMBODIMENTS

Figure 1:
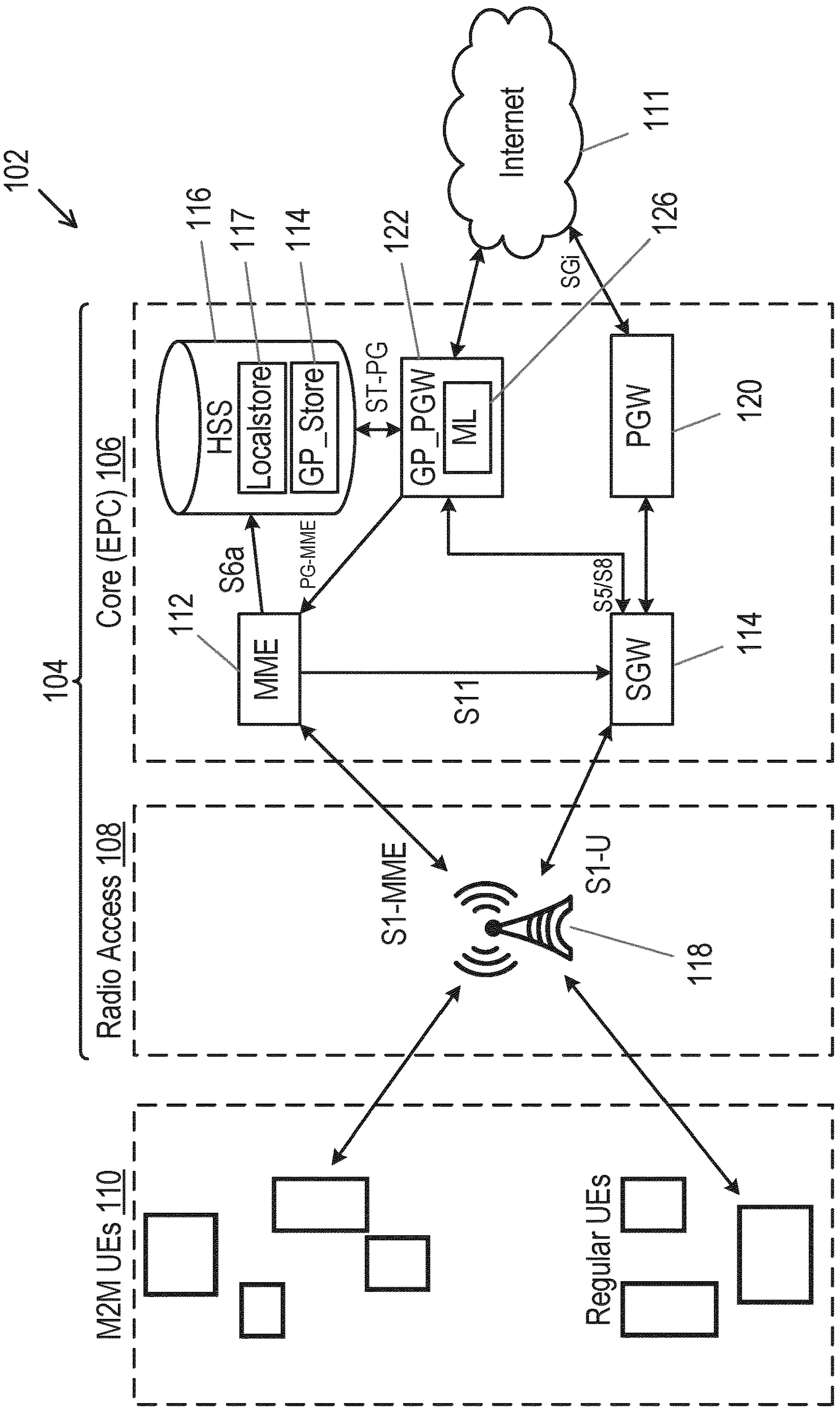
FIG. 1 is a diagram illustrating an implementation of the techniques presented herein in a 4G network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE" and "wireless device", the term "mobile device" may be used, and it will be appreciated that such a device does not necessarily have to be 'mobile' in the sense that it is carried by a user. Instead, the terms "mobile device", "wireless device" and "UE" encompass any device that is capable of communicating with communication networks that operate according to one or more mobile communication standards, such as the Global System for Mobile communications, GSM, Universal Mobile Telecommunications System (UMTS), Wideband Code-Division Multiple Access (WCDMA), Long-Term Evolution (LTE), New Radio (NR), etc.

A cell is associated with a base station, where a base station comprises in a general sense any network node transmitting radio signals in the downlink and/or receiving radio signals in the uplink. Some example base stations, or terms used for describing base stations, are eNodeB, eNB, NodeB, gNB, Wireless Local Area Network (WLAN)

Access Point (AP), macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that the term "base station" as used herein can refer to a "radio access node" or a node in a radio access network (RAN), such as an eNodeB, a gNB or a WLAN AP, or a network node in the RAN responsible for resource management, such as a radio network controller (RNC).

Unless otherwise indicated herein, the signalling described is either via direct links or logical links (e.g. via higher layer protocols and/or via one or more network nodes).

Embodiments of this disclosure provide techniques for wireless device onboarding in communication networks, particularly mobile communication networks, such as those operating according to the standards developed by 3GPP. In the present disclosure techniques are provided in which a wireless device/UE that is attached to a communication network can be authenticated by means of the communication network analysing the behaviour of the wireless device rather than by the use of a-priori (e.g. hardcoded) credentials. In certain embodiments of the present disclosure, a wireless device/UE and the communication network it is attached to can be mutually authenticated by means of analysing each other's behaviour. In this disclosure, behaviour analysis can include uni- or multi-variate analysis of any of, for example, data, voice and messaging traffic patterns, cell of initial attach and subsequent handovers, as well as potential detachments from the communication network.

In certain embodiments, when a wireless device/UE attaches to the communication network, the usual authentication process can be ignored or not used, and instead a special bearer with a predefined access point name (APN) can be set up for the UE. The UE is still allowed to communicate with (i.e. have reachability to) networks outside of the MNO's domain (e.g. the Internet), but information such as any of data traffic patterns, cell identifiers for attach, handovers, detach, messages and voice calls can be timestamped and recorded/stored for a time period following the initial attachment to the communication network. This time period is also referred to herein as a "grace period". Subsequently, data collected during this grace period can be analysed, for example input to a behaviour model trained on similar historical data, in order to determine which enterprise (i.e. an enterprise that is a customer of the MNO) the UE belongs to. In case the analysis/model output is inconclusive, then the UE can be detached from the communication network. Otherwise (i.e. if the analysis/model outputs or indicates an enterprise customer for the UE), the communication network can use appropriate subscription parameters for that enterprise customer (e.g. the communication network may switch to a higher priority bearer, reattach to another APN, adhere to specific Policy and Charging Control (PCC) rules, use billing rules, etc.). Similarly, during the grace period the UE may performs its own diagnostic tests to authenticate the network.

The method described herein can be run in tandem with existing 3GPP authentication, which means that devices with IMSI credentials are authenticated properly (i.e. using the normal 3GPP authentication process), and devices without IMSI credentials use the method described herein for the grace period.

Embodiments of this disclosure can provide one or more of the following advantages. As noted above, the disclosed techniques do not replace challenge-based authentication, but can be used in conjunction with it and for specific types of devices, for example M2M devices produced in bulk, devices exhibiting similar network behaviour (such as smart home devices, connected vehicles, etc.). The disclosed techniques not only lowers the cost for MNOs who do not have to engage in discussions with enterprise customers (e.g. M2M device manufacturers) to procure IMSIs but also lowers the cost of device manufacturing as well. To illustrate this, consider the existing feedback between regulators, MNOs and M2M customers in the United States, that involves not only a long feedback loop between a MNO and a M2M customer whenever M2M customers need new IMSIs, but also have the IMSIs immediately available to regulators for audit purposes.

The terms "M2M customer(s)", "enterprise customer(s)", "enterprise(s)", "users", and more generally "third parties" are used herein generally interchangeably to refer to the entity receiving a connectivity service with a communication network for its "application" or "enterprise application". As an example, an enterprise can be a manufacturer as well as subsequent owner of the wireless device. For example, a vehicle manufacturer and a fleet manager for a courier delivery firm can both be enterprises.

Also as used herein, "MNO" and "network operator" are used generally interchangeably to refer to the entity operating the communication network and offering a connectivity service to third parties such as enterprises, and optionally also individual consumers.

FIG. 1 is a block diagram illustrating various components of an exemplary system 102 in which the techniques described herein are implemented. The system 102 comprises a communication network 104 that is configured according to the 4G 3GPP Long Term Evolution (LTE) standards, but it will be appreciated that the techniques described herein can be applied to other types of 3G, 4G and 5G networks. Moreover, although FIG. 1 shows a system in which the techniques are applied to mobile communication networks, it will be appreciated that the techniques described herein can be applied to other types of communication network, such as wired communication networks, e.g. based on IEEE 802.3x (Ethernet) or Fiber Distributed Data Interface (FDDI).

The communication network 104 comprises a core network 106 (known as the Evolved Packet Core (EPC) in LTE) and a radio access network (RAN) 108. One or more UEs 110 may be able to use connectivity services provided by the communication network 104, for example including accessing a network such as the Internet 111. The UEs 110 can include M2M UEs, such as smart consumer devices (e.g. speakers, drones, kitchen equipment, etc.), smart utility meters (e.g. gas, electricity, water, etc.) and vehicles, and the UEs 110 can include 'more regular' UEs such as smartphones, laptops, tablets, smartwatches, etc.

The core network 106 comprises a Mobility Management Entity (MME) 112 which is a control node for the LTE access network, and one or more Serving Gateways (SGWs) 114 which route and forward user data packets while acting as a mobility anchor. The MME 112 and the SGW(s) 114 communicate via an S11 interface. A Home Subscriber Server (HSS) 116 is also provided in the core network 106 that is connected to the MME 112 via an S6a interface, and the HSS 116 stores and maintains a database 117 (labelled as "Localstore" in FIG. 1) of user subscription information, including user identities (e.g. the IMSI (International Mobile Subscriber Identity) and MSISDN (Mobile Subscriber Integrated Services Digital Network (ISDN) Number) or mobile telephone number), user profile information (such as service subscription states and quality of service (QoS) information and user security information, such as encryption keys used during authentication). The information stored in the Localstore 117 of the HSS 116 relates to existing subscribers of the communication network 104. The MME 112 and SGW 114 communicate with base stations or radio access nodes 118 (referred to as eNBs in LTE) in the RAN 108 via S1-MME and S1-U interfaces respectively. The eNBs 118 provide radio access to the communication network 104, and can include the same or different categories of eNBs, e.g. macro eNBs, and/or micro/pico/femto eNBs. The eNBs 118 communicate with each other over an inter-node interface, for example an X2 interface (not shown in FIG. 1). The core network 106 also comprises a Packet Data Network (PDN) Gateway (PGW) 120 that provides connectivity between the UEs 110 and external networks. The PGW can perform any of policy enforcement, packet filtering for each user, charging support, lawful interception and packet screening, including Deep Packet Inspection (DPI). The PGW 120 is connected to the SGW(s) 114 via S5/S8 interfaces and connected to external networks (e.g. the Internet 111) via an SGi interface.

As noted above, given that UEs belonging to enterprise customers may be large in number but will produce similar behaviour (e.g. similar traffic patterns), embodiments of the techniques described herein introduce a "grace period" (GP) in which conventional authentication of UEs to the communication network is delayed until the wireless device is identified as belonging to a particular enterprise customer. These techniques mean that a wireless device does not need to have an IMSI a priori, but any unique device identifier of that wireless device can be used to identify the wireless device to the communication network. For example, the unique device identifier can be a serial number of the wireless device (e.g. a device serial number (DSN) generated by the enterprise customer or manufacturer of the wireless device), or an International Mobile Equipment Identity (IMEI). In accordance with various embodiments, when a wireless device issues an attach request using the unique device identifier (e.g. serial number (DSN) instead of an IMSI, it is placed in a 'logically isolated' zone in the MNO's communication network until its behaviour is identified and used to link it to an enterprise customer. UEs in the isolated zone are allowed to connect to external networks (e.g. the Internet 111), but for security reasons some or all traffic (e.g. voice, messaging and/or data) can monitored, and/or may be allocated reduced quality of service (QoS) levels.

In the system 102 shown in FIG. 1, the 'isolated zone' is provided by a second PGW 122 in the core network 106. This second PGW 122 is referred to as GP-PGW 122, and it is connected to the SGW(s) 114 via S5/S8 interfaces. The functionality of GP-PGW 122 is similar to the functionality of the 'regular' PGW 120, except that the GP-PGW 122 is used to provide the connectivity between external networks 111 and the UEs 110 that are in the grace period (i.e. the UEs 110 that do not (yet) have IMSIs). As with the PGW 120, the GP-PGW 122 can perform any of policy enforcement, packet filtering for each user, charging support, lawful interception and packet screening for the data traffic that it handles for the UEs 110 in the grace period. Thus, the GP-PGW 122 enables the UEs 110 in the grace period (that are not yet trusted by the communication network 104 and the relevant MNO) and the data traffic for those UEs 110, to be kept logically separate (isolated) from the conventional (trusted/subscribed) UEs 110 that use the PGW 120.

The traffic information collected for the isolated/GP UEs 110 is stored in a distributed ledger, as represented by GP_Store 124 in the HSS 116 of FIG. 1. In the exemplary implementation shown in FIG. 1, a copy of the distributed ledger is stored in the HSS 116. Furthermore, in addition to the conventional HSS function of storing <IMSI, encryption key> pairs for authenticating UEs, which are stored in Localstore 117 with no possibility for this information to be accessed from outside of the MNO's administrative domain, the GP_Store 124 (or alternatively a separate distributed ledger stored in the HSS 116) can also store information (also referred to as "wireless device information" herein) required for the communication network 104 to allow the UE 110 to attach to the communication network 104 just by the UE 110 providing its unique device identifier to the communication network 104 in an attach request. For example, GP_Store 124 (or the separate distributed ledger) can store unique device identifiers for a number of UEs 110 and associated authentication information for those UEs 110 (e.g. a private key to be used in a challenge-response attach procedure).

In general, the distributed ledger 124 is a data structure that abides to the principle of replicability; i.e. it is shared and synchronised across multiple entities—in the present case the MNO/communication network 104 and at least one third party (e.g. an enterprise customer) have an exact copy of the data stored in the distributed ledger 124. In addition, distributed ledgers are immutable—meaning that data cannot be removed from the ledger. This allows for the creation of "audit trails", meaning that it is possible to trace actions on the distributed ledger 124 back in time to the point of origin.

To make use of the techniques described herein, a trust relationship should exist between the MNO for the communication network 104 and a third party (e.g. an enterprise customer) wishing to onboard their wireless devices 110 into the MNO's communication network 104. As part of this trust relationship, the enterprise customer also stores and contributes to the distributed ledger(s) described above, in particular by adding information about the wireless devices that they own to the distributed ledger. Thus in some embodiments the enterprise customer has a respective copy of the distributed ledger(s) (e.g. GP_Store 124). The respective copies of the distributed ledger 124 stored by the MNOs and enterprises are identical (i.e. they comprise the same information), and the synchronisation between the content of the respective copies is maintained using distributed ledger protocols/architecture known to those skilled in the art.

Figure 2:
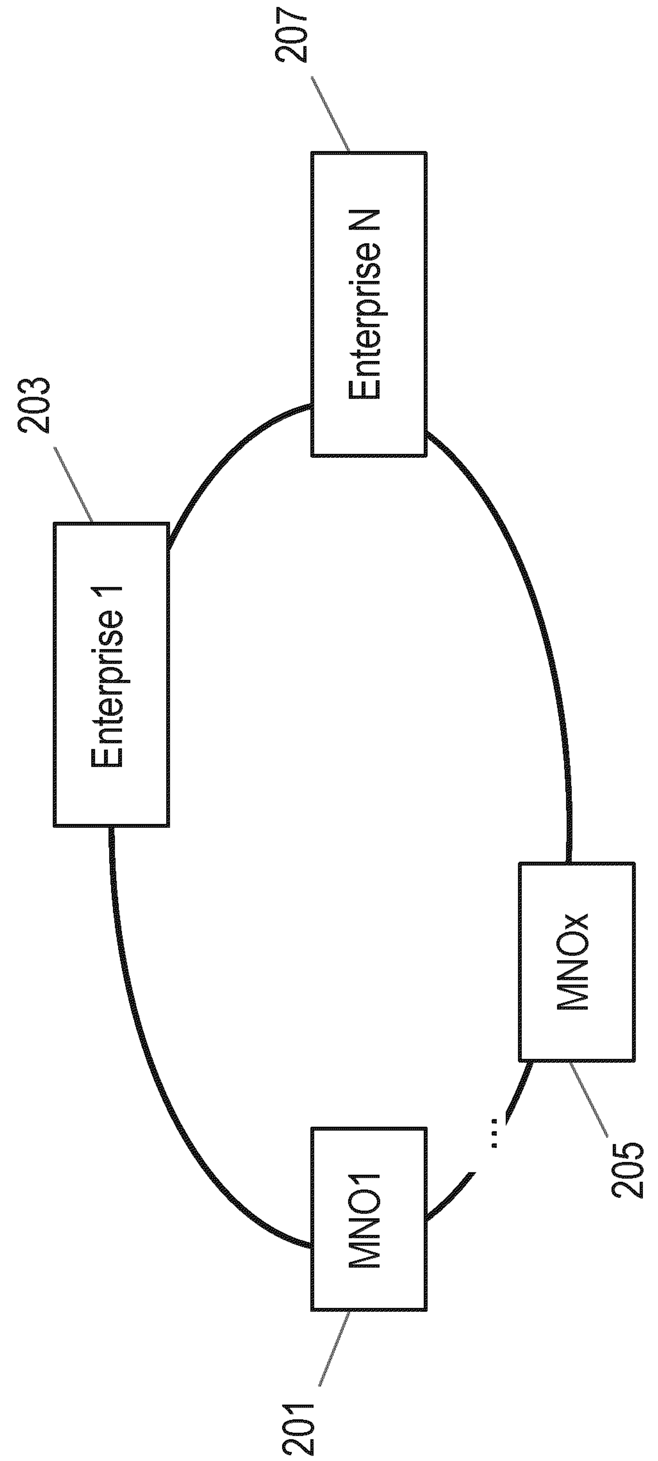
FIG. 2 is a diagram illustrating entities participating in the distributed ledger.

In some implementations, for at least the reason that any given UE 110 may be able to attach to any available communication network, a trust relationship can exist between the enterprise customer and multiple MNOs. Also or alternatively, in some implementations, for at least the reason that a particular MNO may wish to onboard UEs for multiple enterprise customers, a trust relationship can exist between the MNO and multiple enterprise customers. In either case, all participants in the trust relationship (i.e. all MNO(s) and all enterprise customer(s)) have respective copies of the distributed ledger(s) 124. FIG. 2 illustrates the potential participants in a trust relationship. Thus, a first MNO (MNO1) 201 and a first enterprise customer (Enterprise 1) 203 are shown in FIG. 2 as being in a trust relationship. One or more other MNOs (MNOx) 205 may also be part of the trust relationship, and/or one or more other enterprise customers (Enterprise N) 207. In general, each of the MNOs and the third parties can have respective copies of, and contribute to, the distributed ledger(s).

In addition to the distributed ledger 124, an analysis node 126 is provided that can analyse the traffic pattern information for a UE 110 during the time period following the initial attachment with the aim to link the UE 110 to a particular enterprise customer. In FIG. 1 the analysis node 126 is shown as being part of the GP-PGW 122, but it will be appreciated that this is merely an exemplary implementation, and the analysis node 126 can be implemented as a separate logical node in the core network 106, or even as a node separate from the core network 106 or separate from the communication network 104 (provided that the MNO is able to establish and maintain a trust relationship with the analysis node 126).

In various embodiments the analysis node 126 uses machine learning (ML)-based techniques to identify the relevant enterprise customer from the traffic patterns that UEs exhibit during their grace period. The analysis node 126 is also referred to as a traffic pattern detection function.

In conventional 3GPP networks, PGWs (e.g. PGW 120) perform deep packet inspection (DPI) in order to identify traffic flows and match them to Policy and Charging Control (PCC) rules. This is done to enforce quality of service (QoS) requirements or limitations for a UE/customer. However, this matching purely uses headers of packets (e.g. Internet protocol (IP), Transmission Control Protocol (TCP), User Datagram Protocol (UDP), or even application level headers such as Hypertext Transfer Protocol (HTTP)), and does not take into account other network-level traffic characteristics such as spatio-temporal throughput on the uplink (UL) and/or downlink (DL) interface. The analysis node 126 described herein can enhance the information obtained using the existing DPI function with machine learning, e.g. by using historical data and/or probabilistic approaches, to make use of a behaviour model to match traffic pattern to enterprise customer.

In the implementation of FIG. 1, the GP-PGW 122 has an interface ST-PG with the GP_Store 124 in the HSS 116. This interface is used by the analysis node 126 in the GP-PGW to retrieve information from the distributed ledger 124 required to match incoming data traffic patterns to enterprise customers. It will be appreciated that in embodiments where the analysis node 126 is separate from the GP-PGW 122, the analysis node 126 may have a respective interface to the GP-PGW 122 to enable this information to be provided to the analysis node 126. In alternative embodiments where the analysis node 126 is separate from the GP-PGW 122, the interface ST-PG may be between the analysis node 126 and the distributed ledger 124/HSS 116.

There is also an interface between the analysis node 126 and the MME 112, which is denoted PG-MME in FIG. 1. This interface is used by the analysis node 126 in the GP-PGW 122 to instruct the MME 112 to either create a regular PDN connection for a UE 110 if the analysis node 126 identifies that this UE belongs to a certain enterprise customer based on the behaviour observed in the grace period, or to blacklist (i.e. block) a UE 110 if the grace period expires and the analysis node 126 has not identified that this UE belongs to a particular enterprise customer. As with the ST-PG interface, in embodiments where the analysis node 126 is separate from the GP-PGW 122, the analysis node 126 may have a respective interface to the GP-PGW 122 to enable the analysis node 126 to provide these instructions to the GP-PGW 122 for forwarding to the MME 112. In alternative embodiments where the analysis node 126 is separate from the GP-PGW 122, the interface PG-MME may be between the analysis node 126 and the MME 112.

Figure 3:
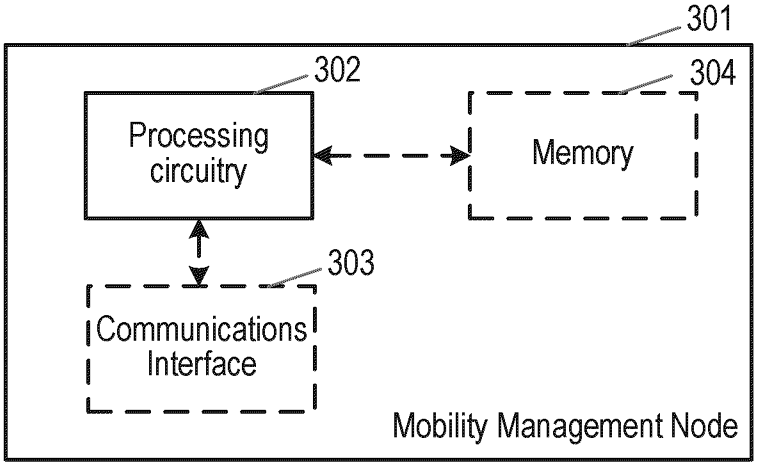
FIG. 3 is a block diagram of a mobility management node according to various embodiments.

FIG. 3 is a block diagram of a mobility management node 301 according to various embodiments that can be used to implement the techniques described herein. It will be appreciated that the mobility management node 301 may comprise one or more virtual machines running different software and/or processes. The mobility management node 301 may therefore comprise one or more servers, switches and/or storage devices and/or may comprise cloud computing infrastructure that runs the software and/or processes. In a 4G network the mobility management node 301 may be known as an MME, and in a 5G network the mobility management node 301 may be known as an Access and Mobility Management Function (AMF).

The processing circuitry 302 controls the operation of the mobility management node 301 and can implement the methods described herein in relation to the mobility management node. The processing circuitry 302 can comprise one or more processors, processing units, multi-core processors or modules that are configured or programmed to control the mobility management node 301 in the manner described herein. In particular implementations, the processing circuitry 302 can comprise a plurality of software and/or hardware modules that are each configured to perform, or are for performing, individual or multiple steps of the method described herein in relation to the mobility management node 301.

In some embodiments, the mobility management node 301 may optionally comprise a communications interface 303. The communications interface 303 can be for use in communicating with other nodes, such as other virtual nodes. For example, the communications interface 303 can be configured to transmit to and/or receive from other nodes or network functions requests, resources, information, data, signals, or similar. The processing circuitry 302 may be configured to control the communications interface 303 of the mobility management node 301 to transmit to and/or receive from other nodes or network functions requests, resources, information, data, signals, or similar.

Optionally, the mobility management node 301 may comprise a memory 304. In some embodiments, the memory 304 can be configured to store program code that can be executed by the processing circuitry 302 to perform the method described herein in relation to the mobility management node 301. Alternatively or in addition, the memory 304 can be configured to store any requests, resources, information, data, signals, or similar that are described herein. The processing circuitry 302 may be configured to control the memory 304 to store any requests, resources, information, data, signals, or similar that are described herein.

Figure 4:
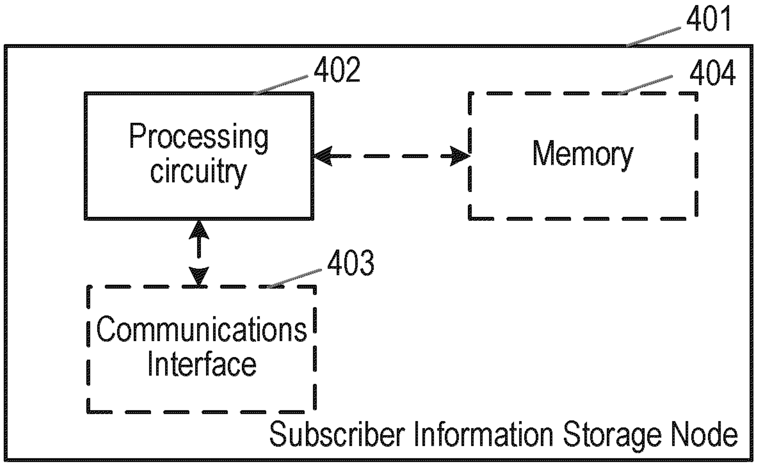
FIG. 4 is a block diagram of a subscriber information storage node according to various embodiments.

FIG. 4 is a block diagram of a subscriber information storage node 401 according to various embodiments that can be used to implement the techniques described herein. It will be appreciated that the subscriber information storage node 401 may comprise one or more virtual machines running different software and/or processes. The subscriber information storage node 401 may therefore comprise one or more servers, switches and/or storage devices and/or may comprise cloud computing infrastructure that runs the software and/or processes. In a 4G network the subscriber information storage node 401 may be known as a HSS, and in a 5G network the subscriber information storage node 401 may be known as a Unified Data Management (UDM) node.

The processing circuitry 402 controls the operation of the subscriber information storage node 401 and can implement the methods described herein in relation to the subscriber information storage node 401. The processing circuitry 402 can comprise one or more processors, processing units, multi-core processors or modules that are configured or programmed to control the subscriber information storage node 401 in the manner described herein. In particular implementations, the processing circuitry 402 can comprise a plurality of software and/or hardware modules that are each configured to perform, or are for performing, individual or multiple steps of the method described herein in relation to the subscriber information storage node 401.

In some embodiments, the subscriber information storage node 401 may optionally comprise a communications interface 403. The communications interface 403 can be for use in communicating with other nodes, such as other virtual nodes. For example, the communications interface 403 can be configured to transmit to and/or receive from other nodes or network functions requests, resources, information, data, signals, or similar. The processing circuitry 402 may be configured to control the communications interface 403 of the subscriber information storage node 401 to transmit to and/or receive from other nodes or network functions requests, resources, information, data, signals, or similar.

Optionally, the subscriber information storage node 401 may comprise a memory 404. In some embodiments, the memory 404 can be configured to store program code that can be executed by the processing circuitry 402 to perform the method described herein in relation to the subscriber information storage node 401. Alternatively or in addition, the memory 404 can be configured to store any requests, resources, information, data, signals, or similar that are described herein. The processing circuitry 402 may be configured to control the memory 404 to store any requests, resources, information, data, signals, or similar that are described herein.

Figure 5:
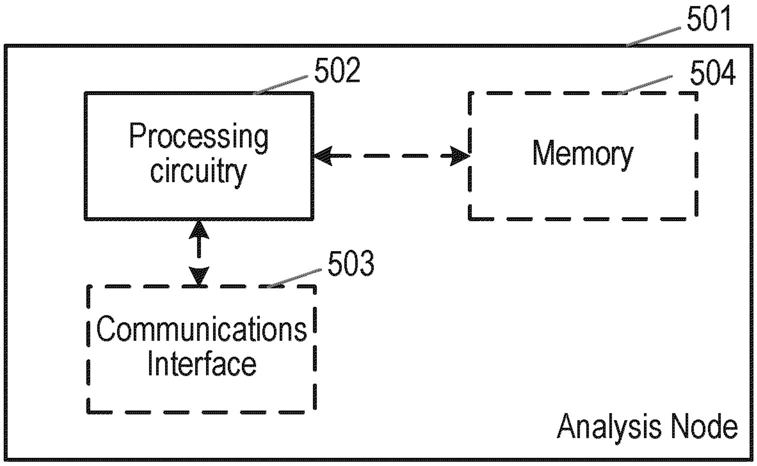
FIG. 5 is a block diagram of an analysis node according to various embodiments.

FIG. 5 is a block diagram of an analysis node 501 according to various embodiments that can be used to implement the techniques described herein. It will be appreciated that the analysis node 501 may comprise one or more virtual machines running different software and/or processes. The analysis node 501 may therefore comprise one or more servers, switches and/or storage devices and/or may comprise cloud computing infrastructure that runs the software and/or processes.

The processing circuitry 502 controls the operation of the analysis node 501 and can implement the methods described herein in relation to the analysis node 501. The processing circuitry 502 can comprise one or more processors, processing units, multi-core processors or modules that are configured or programmed to control the analysis node 501 in the manner described herein. In particular implementations, the processing circuitry 502 can comprise a plurality of software and/or hardware modules that are each configured to perform, or are for performing, individual or multiple steps of the method described herein in relation to the analysis node 501.

In some embodiments, the analysis node 501 may optionally comprise a communications interface 503. The communications interface 503 can be for use in communicating with other nodes, such as other virtual nodes. For example, the communications interface 503 can be configured to transmit to and/or receive from other nodes or network functions requests, resources, information, data, signals, or similar. The processing circuitry 502 may be configured to control the communications interface 503 of the analysis node 501 to transmit to and/or receive from other nodes or network functions requests, resources, information, data, signals, or similar.

Optionally, the analysis node 501 may comprise a memory 504. In some embodiments, the memory 504 can be configured to store program code that can be executed by the processing circuitry 502 to perform the method described herein in relation to the analysis 501. Alternatively or in addition, the memory 504 can be configured to store any requests, resources, information, data, signals, or similar that are described herein. The processing circuitry 502 may be configured to control the memory 504 to store any requests, resources, information, data, signals, or similar that are described herein.

Figure 6:
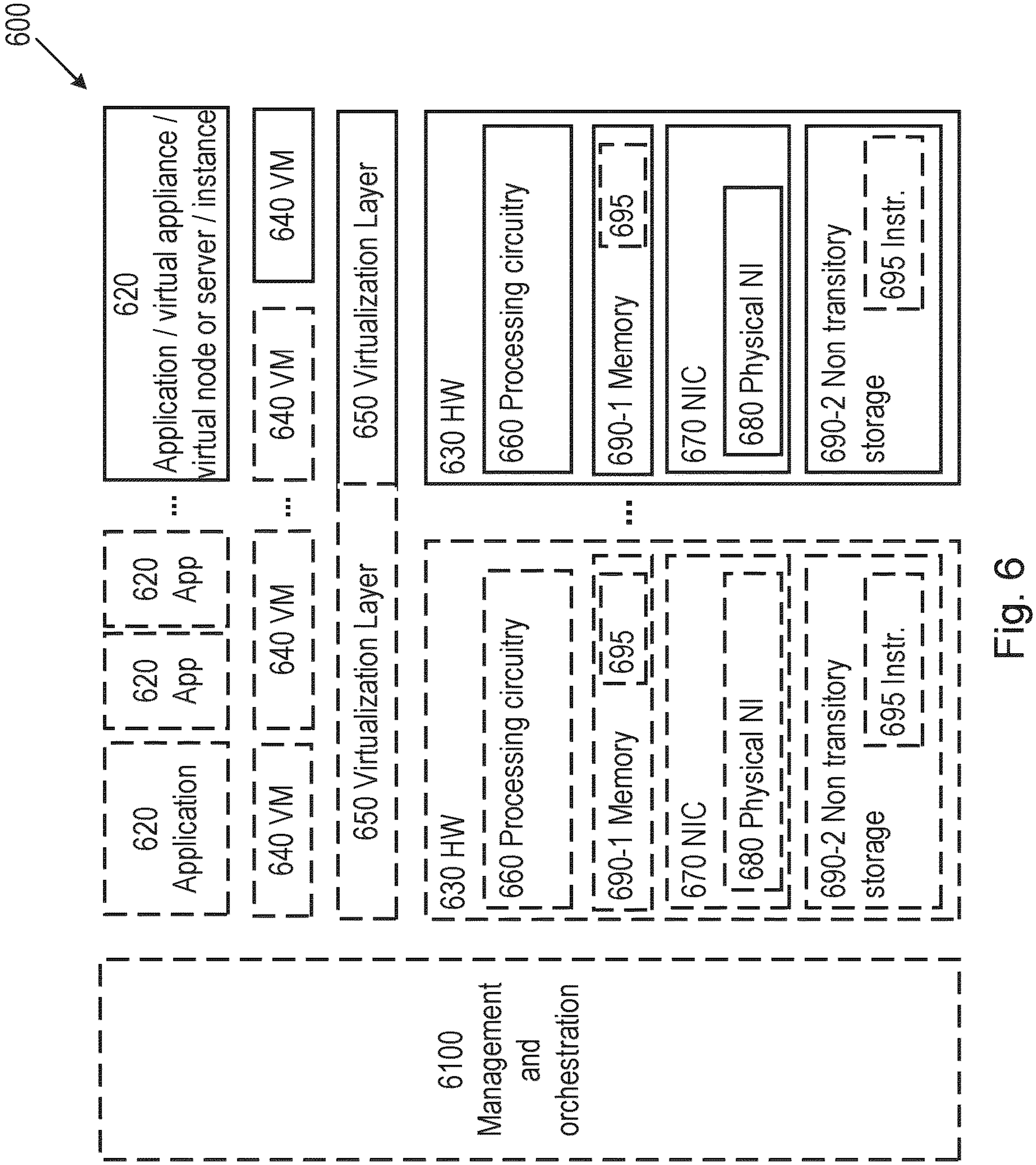
FIG. 6 is a schematic block diagram illustrating a virtualisation environment in which functions implemented by some embodiments may be virtualised.

FIG. 6 is a schematic block diagram illustrating a virtualisation environment 600 in which functions implemented by some embodiments may be virtualised, such as functions of any of the mobility management node 112/301, the subscriber information storage node 116/401, and/or the analysis node 126/501. In the present context, virtualising means creating virtual versions of apparatuses or devices which may include virtualising hardware platforms, storage devices and networking resources. As used herein, virtualisation can be applied to a mobility management node 112/301, a subscriber information storage node 116/401 and an analysis node 126/501, or components thereof, and relates to an implementation in which at least a portion of the functionality is implemented as one or more virtual components (e.g., via one or more applications, components, functions, virtual machines or containers executing on one or more physical processing nodes in one or more computer networks).

In some embodiments, some or all of the functions described herein may be implemented as virtual components executed by one or more virtual machines implemented in one or more virtual environments 600 hosted by one or more hardware nodes 630.

The functions of any of the mobility management node 112/301, the subscriber information storage node 116/401 and the analysis node 126/501 may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualisation environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualisation environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660.

Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualisation layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualisation layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualisation layer 650, which may sometimes be referred to as a virtual machine monitor (VMM). Virtualisation layer 650 may present a virtual operating platform that appears like networking hardware to virtual machine 640.

As shown in FIG. 6, hardware 630 may be a standalone network node with generic or specific components. Hardware 630 may be part of a larger cluster of hardware (e.g. such as in a data centre or customer premise equipment (CPE)) where many hardware nodes work together and are managed via management and orchestration (MANO) 6100, which, among others, oversees lifecycle management of applications 620.

Virtualisation of the hardware is in some contexts referred to as network function virtualisation (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualised machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

As noted above, distributed ledger 124 is provided for storing behaviour information for wireless devices for a time period following the attachment to the communication network 104, where the wireless device is not yet authenticated/subscribed to the communication network 104, and where the attachment is permitted on the basis of a non-IMSI identifier, such as a device serial number or IMEI. The distributed ledger 124 also stores information on wireless devices owned by one or more third parties (e.g. enterprises) that may or have used the communication network 104.

Figure 7A:
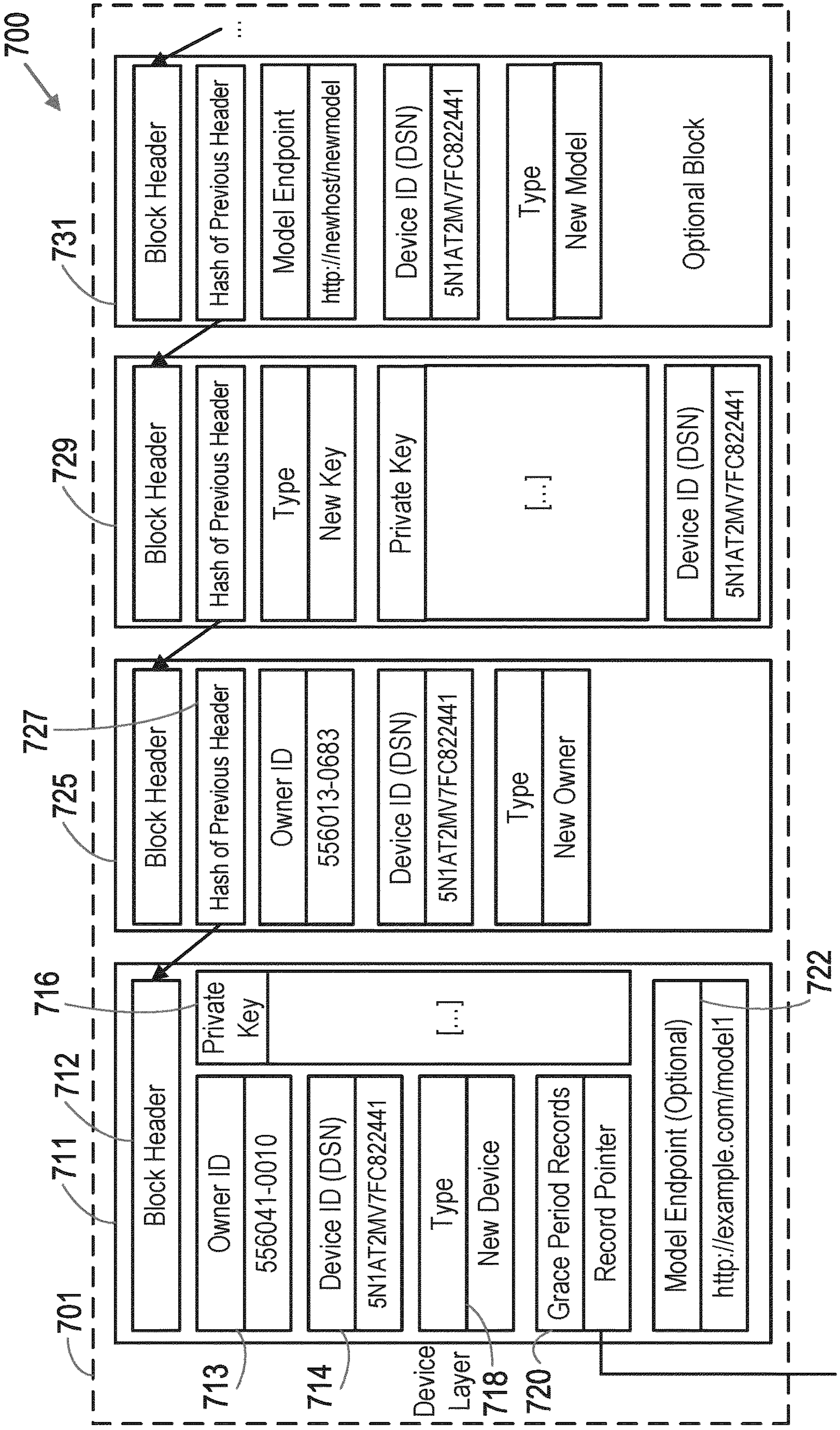
FIG. 7 is an illustration of an exemplary distributed ledger according to various embodiments.
Figure 7B:
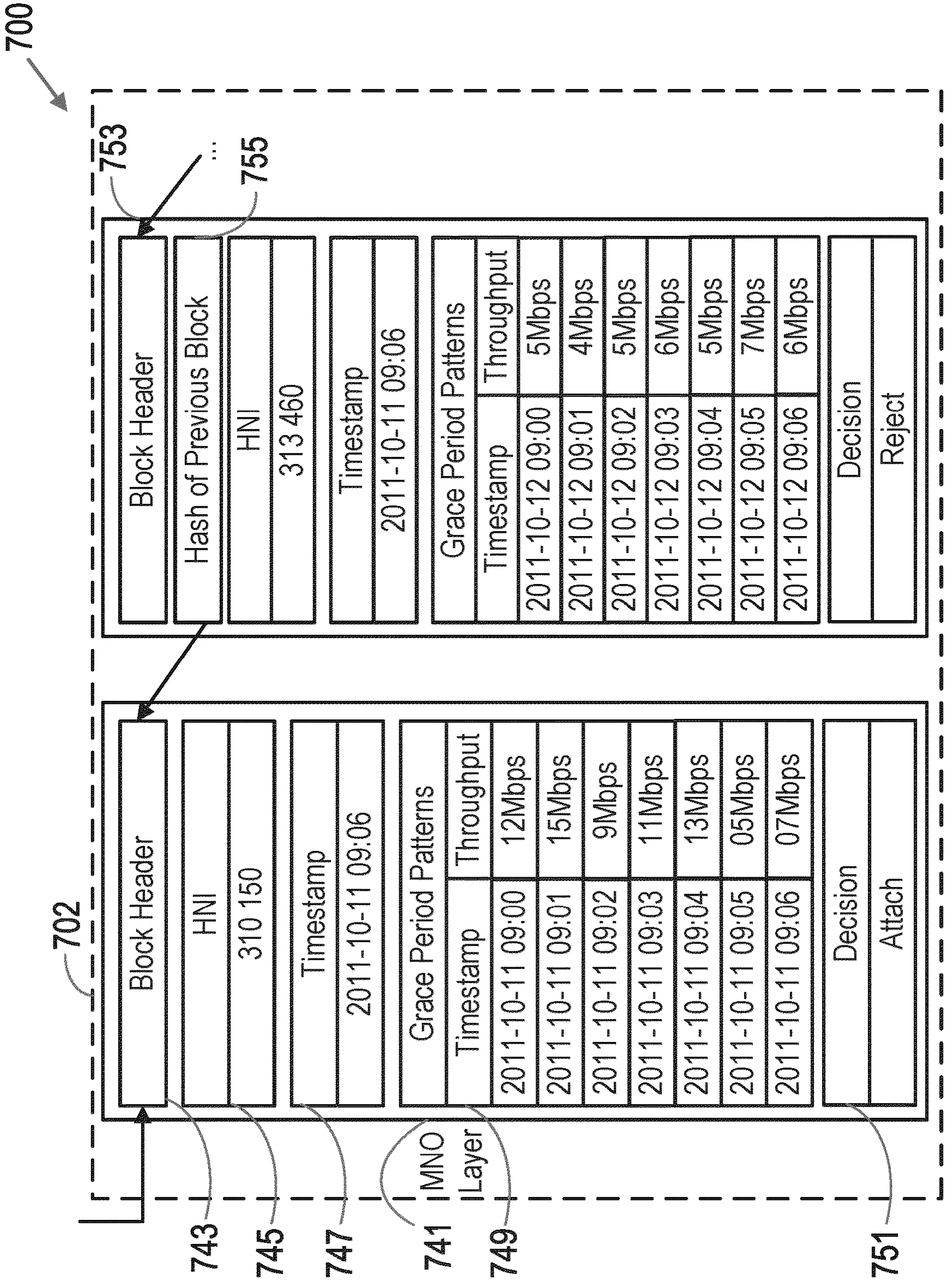

An exemplary distributed ledger 700 in the form of several blockchains (or sub-blockchains) according to various embodiments is shown in FIG. 7. Specific implementations of the distributed ledger 700 may include any or all of the illustrated layers, and/or any of the illustrated blockchains/sub-blockchains. Likewise, specific implementations of the distributed ledger 700 may include any or all of the types of information shown within each block of the blockchains/sub-blockchains.

Thus, the distributed ledger 700 shown in FIG. 7 comprises two layers, a first layer 701 that stores information about a plurality of wireless devices (also referred to as "wireless device information" herein) in a first blockchain, including a unique device identifier that will be provided by the wireless device when attempting to attach to the communication network 104, and the current owner of each wireless device. The second layer 702 stores behaviour information in a respective blockchain for any wireless device identified in the first layer 701 that has attached to a communication network for one or more grace periods (for example it is possible that a particular wireless device has attempted to attach to different communication networks over time). The first layer 701 is also referred to herein as the "Device layer", "first blockchain" or "Layer 1". The second layer 702 is also referred to herein as the "MNO layer", "second blockchain" or "Layer 2".

Several different types of wireless device information can be included in the device layer 701 for any given wireless device 110. In this illustrated embodiment, the different types of information are added to the blockchain as respective blocks. Also in the illustrated embodiment, each block of the blockchain relates to a single wireless device 110. Each block comprises one or more data fields that include information for the relevant wireless device 110. As noted below, although FIG. 7 shows the different types of blocks as comprising different combinations of the available data fields, it will be appreciated that in some implementations each block of the first blockchain 701 can include the same set of data fields, with only the relevant data fields being populated with data.

A first block 711 of the first blockchain 701 is a "New Device" block type. This type of block is used to add information about a new wireless device to the distributed ledger 701. This first block includes information identifying the first block 711 in a block header data field 712, information identifying the owner of the wireless device (in "Owner ID" field 713), a unique device identifier for the wireless device 110, such as a DSN (in "Device ID (DSN)" field 714), (optionally) a private encryption key of the wireless device 110 which is used for authentication of this wireless device 110 to a communication network (in "Private key" field 716), an indication of the block type of the first block (in "Type" field 718), which in this case is a "New Device" type, and a data field ("Grace Period Records" field 720) containing a pointer to the MNO layer 702, and in particular a pointer to a blockchain in the MNO layer 702 that includes the behaviour information for this wireless device 110 during one or more grace periods.

Optionally, the "New Device" block 711 may also contain a Model Endpoint data field 722. This data field 722 indicates a network endpoint (e.g. a website address or a Uniform Resource Locator (URL)), for example provided by the owner of the wireless device 110, which can be used by the analysis node 126 to retrieve or directly execute a behaviour model (e.g. machine learning model) or pattern that enables the analysis node 126 to estimate whether an observed pattern of behaviour for the wireless device 110 during the grace period actually belongs to a wireless device owned by the enterprise or not. For example, considering that the grace period behaviour information/pattern data can be a time series of aggregate throughput (as outlined below with reference to the second layer 702), then the behaviour model that an enterprise can offer could be a recurrent neural network (RNN) that classifies the input data as "legitimate" or "not legitimate", corresponding to a wireless device that is owned by the enterprise or not.

In the example of FIG. 7, this exemplary blockchain contains information for vehicles in Sweden, and so the Device ID (DSN) 714 of the wireless device 110 is a vehicle information number (VIN), and the Owner ID 712 is a Swedish company number (företagsnummer).

The second block 725 of the first blockchain 711 is a "New Owner" block type. This type of block is used to record information about a change in ownership of a wireless device for which information is already stored in the first blockchain 711. For example, this could apply where a car is sold by the manufacturer to a dealership, or by the dealership to a fleet manager, and the ownership transfer is registered in the first blockchain 711. The second block 725 comprises a block header data field 712 that stores information identifying the second block 725, and a data field 727 that stores a hash of the block header 712 for the previous block in the first blockchain 701 (thereby creating the blockchain). In alternative implementations, the data field 727 can store a hash of the whole previous block in the first blockchain 701. The second block 725 also comprises an Owner ID field 713, Device ID (DSN) field 714 and Type field 718. As the second block 725 is a new owner block, the Owner ID field 713 indicates the identity of the new owner of the wireless device indicated in Device ID (DSN) field 714.

The third block 729 of the first blockchain 711 is a "New Key" block type. This type of block is used to record a change in the private key of the wireless device 110 to be used for authentication. For security reasons, the private key may be routinely updated by the enterprise that owns the wireless device 110. For example, the enterprise may request a new key from a trusted key authority. The third block 729 comprises a block header data field 712 that stores information identifying the third block 731, and a data field 727 that stores a hash of the block header 712 for the previous block in the first blockchain 701 (thereby extending the blockchain). In alternative implementations, the data field 727 can store a hash of the whole previous block in the first blockchain 101. The third block 729 also comprises a Device ID field 714, a Private key field 716 and Type field 718. As the third block 729 is a new key block, the Private Key field 716 indicates the new private key of the wireless device indicated in Device ID (DSN) field 714.

The fourth block 731 in the first blockchain 711 is an optional "New Model" block type. This type of block can be used where a model endpoint provided by an enterprise for a particular wireless device (in Model Endpoint field 722) is updated (e.g. a new website address or URL from where the behaviour model can be downloaded or retrieved). The fourth block 731 comprises a block header data field 712 that stores information identifying the fourth block 731, and a data field 727 that stores a hash of the previous block or a hash of the block header 712 for the previous block in the first blockchain 701. The fourth block 731 also comprises Device ID field 714, Type field 718 and Model Endpoint field 722. As the fourth block 731 is a new model block, the Model Endpoint field 722 indicates the address or location of the new behaviour model for the wireless device indicated in Device ID (DSN) field 714.

It will be appreciated that the first blockchain 711 shown in FIG. 7 is merely exemplary and the different block types may be used in any suitable order depending on the change or addition that is to be recorded in the first blockchain 711. It will also be appreciated that the first blockchain 711 can store information for a plurality of wireless devices provided by a particular enterprise (third party) and/or by different enterprises, in which case the information for the different wireless devices is added using respective 'new device' blocks similar to block 711.

As noted above, the new device block 711 for a particular wireless device 110 includes a Grace Period Records field 720 that provides a pointer to the relevant behaviour information for the respective wireless device 110 stored in the second layer 702 (MNO layer).

As noted above, the second layer 702 stores behaviour information in a respective blockchain for any wireless device identified in the first layer 701 that has attached to a communication network for one or more grace periods (for example it is possible that a particular wireless device has attempted to attach to different communication networks over time).

The blockchains in the MNO layer 702 are each formed from a single block type that contains information about a particular grace period session for a particular wireless device 110. Each block comprises one or more data fields that include information for the relevant wireless device 110. The MNO layer 702 can include a respective blockchain or sub-blockchain for each of the wireless devices 110 identified in the first layer 701. FIG. 7 shows a single blockchain in the MNO layer 702 relating to the wireless device identified in the first block 711 of the first blockchain 701. When the first blockchain 701 comprises information for a second wireless device 110, the second layer 702 will comprise a second Layer 2 blockchain that includes the behaviour information for that second wireless device 110, and so on.

The first block 741 of the second blockchain 702 comprises information identifying the first block 741 in a block header data field 743, information identifying the communication network that the wireless device attached to (in "HNI" (Home Network Identifier) field 745), information indicating when the grace period ended for the wireless device (in "Timestamp" field 747), the behaviour information recorded for the wireless device in the grace period (in "Grace Period Patterns" field 749), and an indication of a decision taken for the wireless device in relation to whether the wireless device can properly attach to the communication network or whether it should be detached from the communication network (in "Decision" field 751).

Thus, the first block 741 contains information about the operator that the wireless device attached to (the HNI, which is a global identifier unique for every operator). The Timestamp 747 indicates the point in time that the grace period ended, and the Decision 751 indicates the result of analysis by the analysis node 126 (e.g. either the wireless device is attached or rejected). It should be noted that as far as the decision is concerned, after several one or more consecutive rejections and given an imminent (further) rejection of a wireless device requesting to attach to a communication network, an MNO may decide to 'blacklist' or block the wireless device, in which case the Decision field 751 may indicate "Blacklisted" or "Blocked" instead of "Rejected").

A second block 753 of the second blockchain 702 is also shown. This second block 753 comprises behaviour information for the wireless device for a further grace period initiated following an attachment to a communication network. The second block 753 has generally the same data structure as the first block 741, and thus the second block 753 includes Block Header field 743, a HNI field 745 indicating the identity of the communication network that the wireless device connected to (which in this example is a different communication network to the network that the first block 745 relates to), Timestamp field 747, Grace Period Patterns field 749 and Decision field 751. The second block 753 also comprises a data field 755 that stores a hash of the block header 743 for the previous block in the second blockchain 702 (thereby creating the blockchain). In alternative implementations, the data field 755 can store a hash of the whole previous block in the second blockchain 702.

The behaviour information in the "Grace Period Patterns" field 749 can be used for establishing whether the wireless device is legitimate and not an impersonator. There can be several different types of behaviour information that can be used in conjunction or in isolation, depending on the implementation, to indicate device behaviour. The types of behaviour information can include any of:

- Throughput (i.e. data rate) patterns during the grace period. One way to record this could be the average uplink/downlink throughput for smaller timespans within the grace period. This behaviour information is illustrated in the Grace Period Patterns field 749 in FIG. 7, with the throughput being recorded per minute.
- Sequence of handovers and duration of attachment to every cell for the wireless device while in the grace period. This behaviour information may indicate mobility patterns. It is also important to note that the MNO knows the location of every cell in its communication network, so it should be possible to geographically pinpoint wireless device movement.
- Wireless device power level and radio resource control (RRC) state (i.e. idle, active, inactive). The power level recorded may be the maximum wireless device transmission power and may be indicative of the wireless device identity.
- Further analysis of UE traffic via Deep Packet Inspection (DPI) on behalf of the MNO by the GP-PGW 122, which uses DPI for a more thorough analysis of a wireless device's mobile traffic. Some non-limiting examples of behaviour information that can be obtained using the DPI to analyse the data packet headers are:
  - Popular data destinations, in case the device is trying to reach a certain destination (for example a wireless device in the form of a sensor device trying to reach a server to record its observations). The "destination address" packet header can be studied in conjunction with a timestamp, in case for example the wireless device is exhibiting a certain temporal pattern when trying to reach a particular destination (e.g. periodical request). Likewise, for downlink data packets, popular data origins can be considered, for example in case the device is receiving data from a particular origin (e.g. a server).
  - Format and value of data payload, in case the wireless device is using a consistent data format and/or value ranges. An example would be a sensor device transmitting data using JavaScript Object Notation (JSON) for reporting temperature in range of 10-30 degrees Celsius.

As noted above, the data structure of the distributed ledger 700 shown in FIG. 7, including the separate layers 701, 702 and/or the exemplary blocks, is merely exemplary, and it will be appreciated by those skilled in the art that the described information can be stored in a number of different ways in distributed ledger 700. In some alternative embodiments, the information contained in the different layers 701, 702 can be combined into a single layer. In some alternative embodiments, the second layer 702 may comprise a single blockchain with each block including the behaviour information for a respective wireless device 110. In some alternative embodiments, the distributed ledger 700 does not use blockchains to store the information, and an alternative data structure can be used. For example the distributed ledger can be in the form of one or more distributed hash tables (DHTs).

In some embodiments, the third party/ies (and in some embodiments only the third parties) is able to add new information about wireless devices to the Device Layer blockchain 701. The MNO/communication network 104 is able to read this information when a wireless device 110 requests attachment to the communication network 104. In some embodiments, the MNO(s)/communication network(s) (and in some embodiments only the MNOs/communication networks) are able to add new behaviour information blocks to the MNO Layer blockchain 702. The third parties are able to read this information in their local copies of the distributed ledger 700.

As noted, the MNO/communication network 104 and the third party/ies each store a local copy of the distributed ledger 700, and the distributed ledger architecture ensures that the local copies of the distributed ledger 700 are kept aligned or synchronised as new blocks are added. For example a third party can add blocks containing information about a batch of newly manufactured wireless devices to the device layer 701. The local copies of the distributed ledger 700 will then be updated to include a copy of the new blocks.

In further alternative embodiments for the data structure, the Layer 1 information and the Layer 2 information can be stored in separate distributed ledgers. For example, the Layer 1 information can be stored in a first distributed ledger, and the Layer 2 information can be stored in the first distributed ledger or a second distributed ledger. In implementations where the Layer 2 information is stored in a second distributed ledger, the information stored in that layer is referred to as "further wireless device information" herein.

Figure 8A:
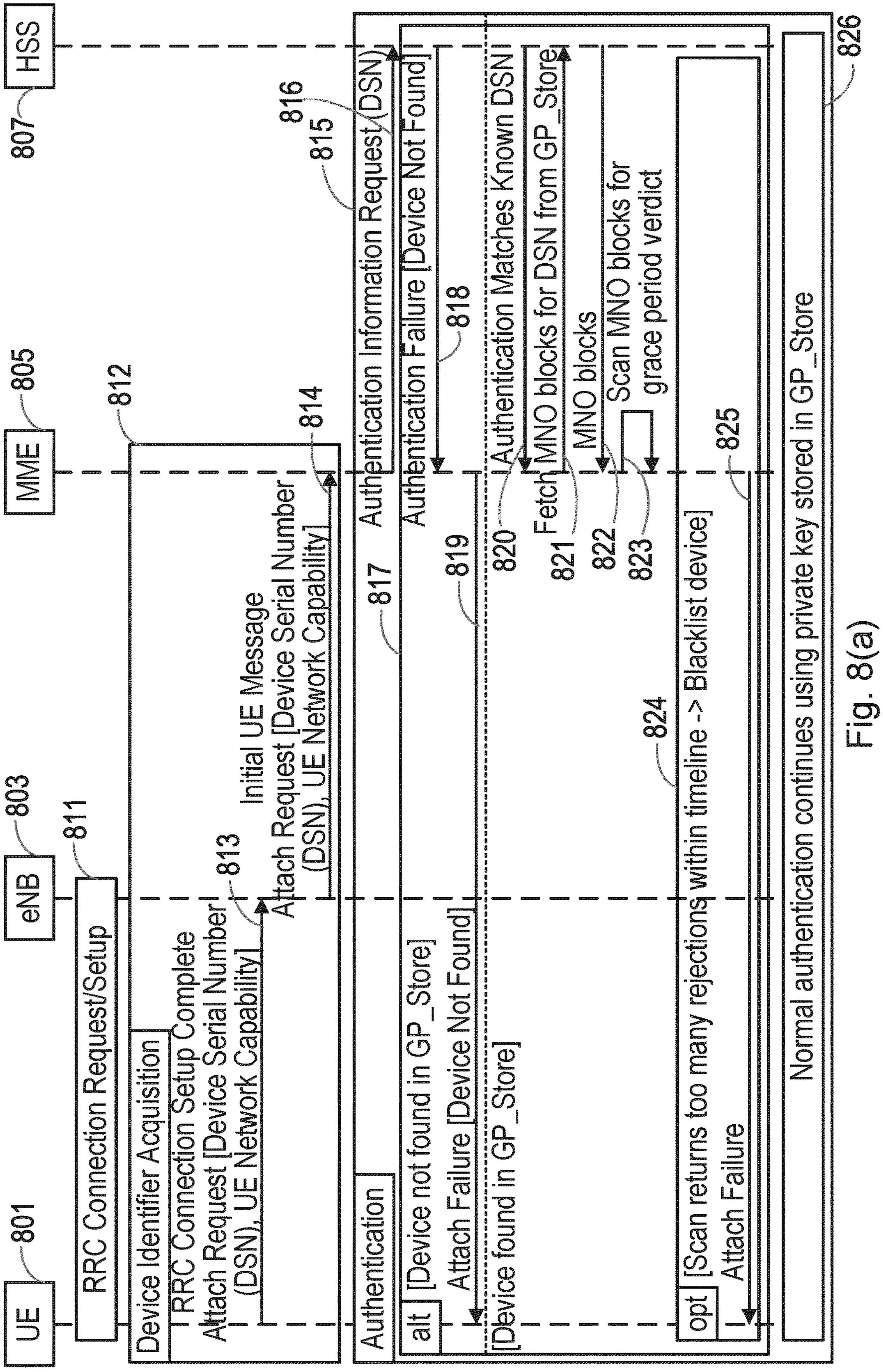
FIG. 8 is a signalling diagram illustrating an exemplary attach process according to embodiments implemented in a 4G network.
Figure 8B:
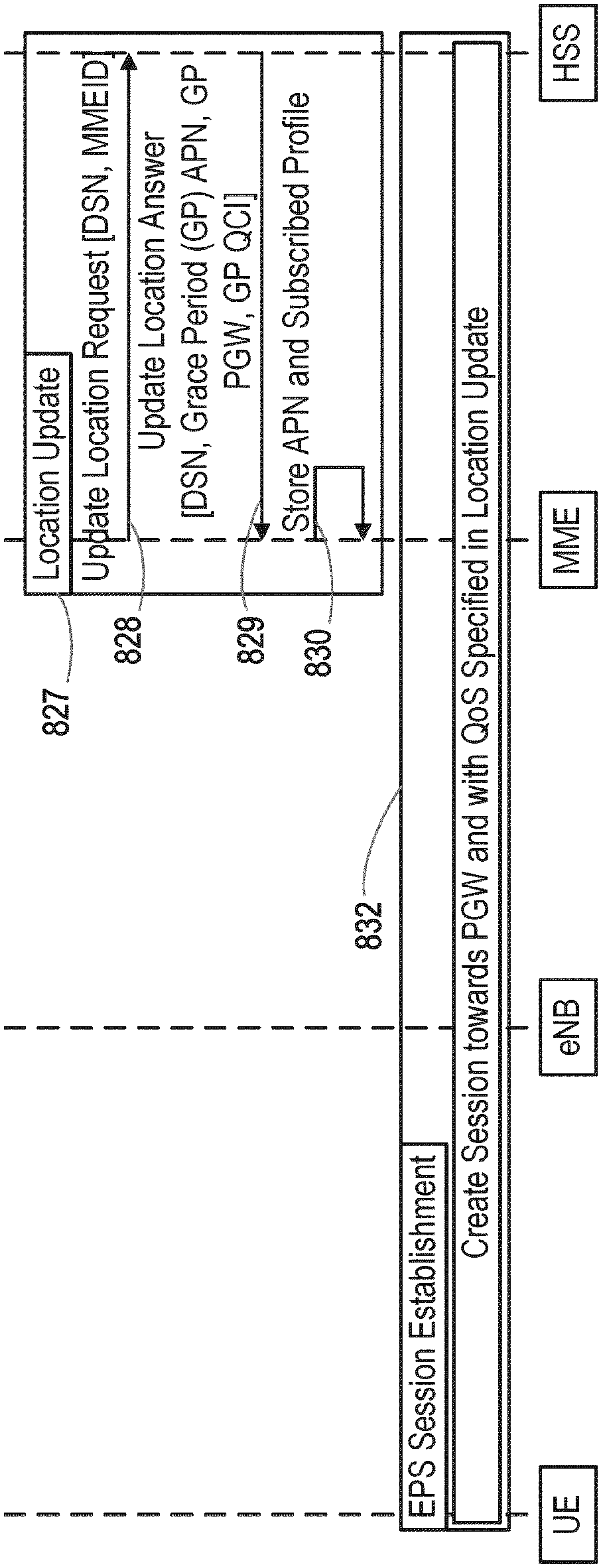
Figure 9A:
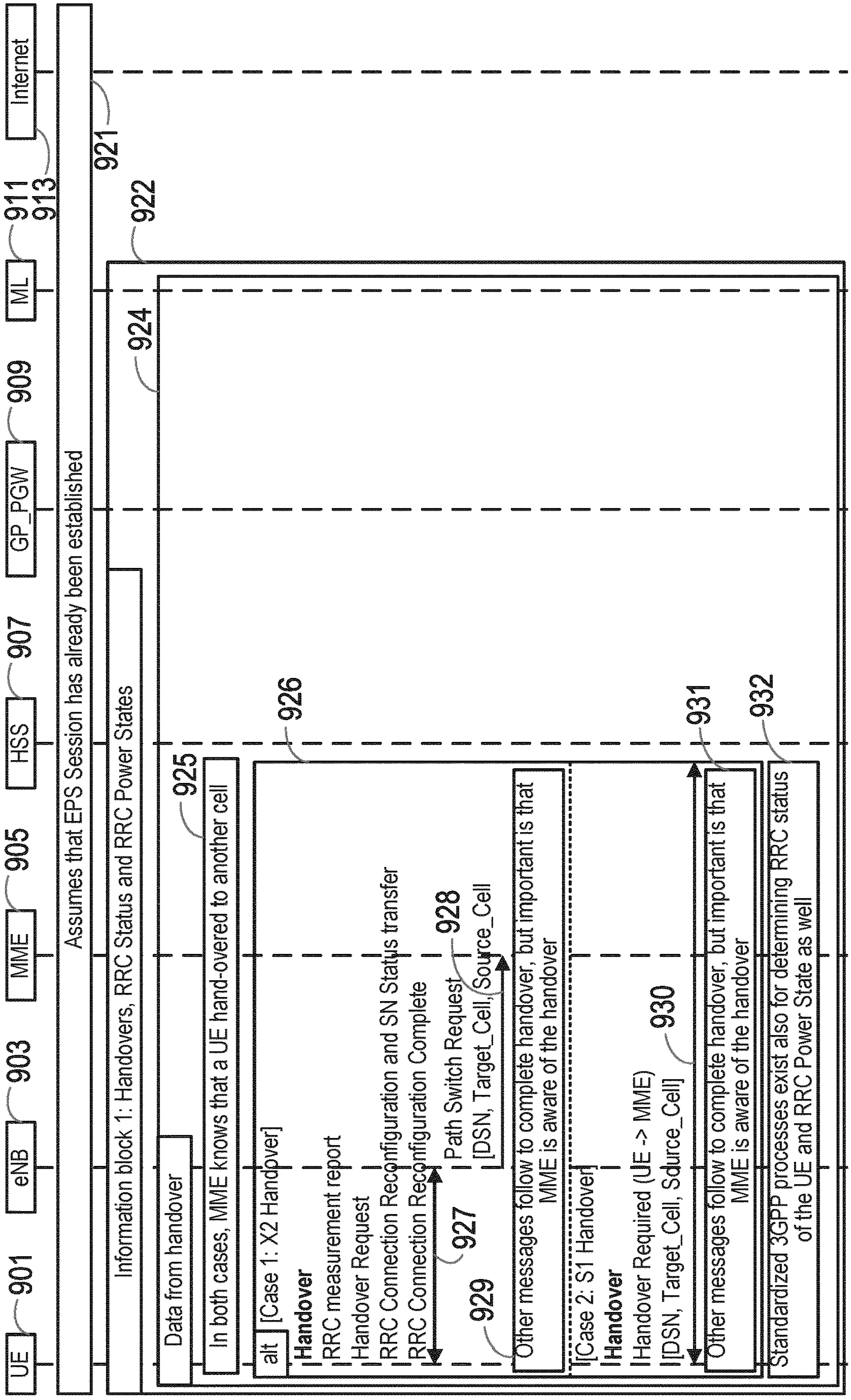
FIG. 9 is a signalling diagram illustrating an exemplary analysis process according to embodiments implemented in a 4G network.
Figure 9B:
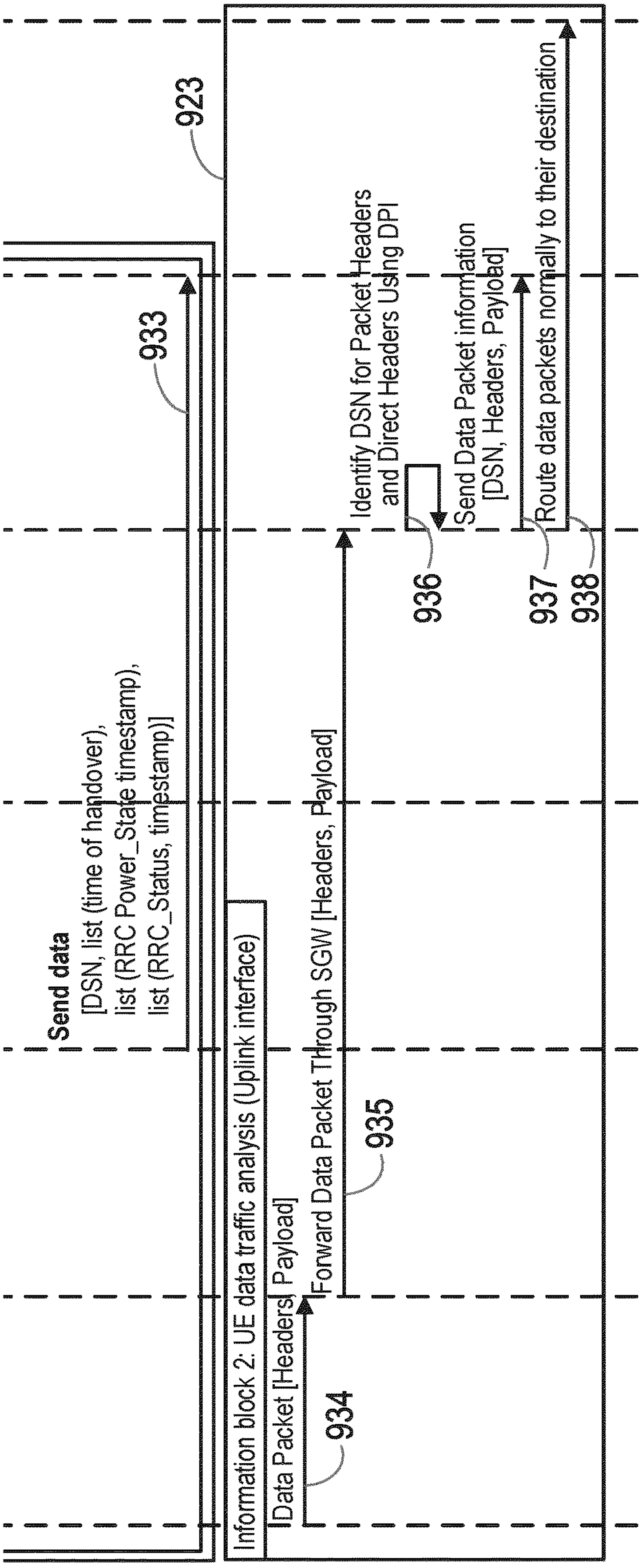
Figure 9C:
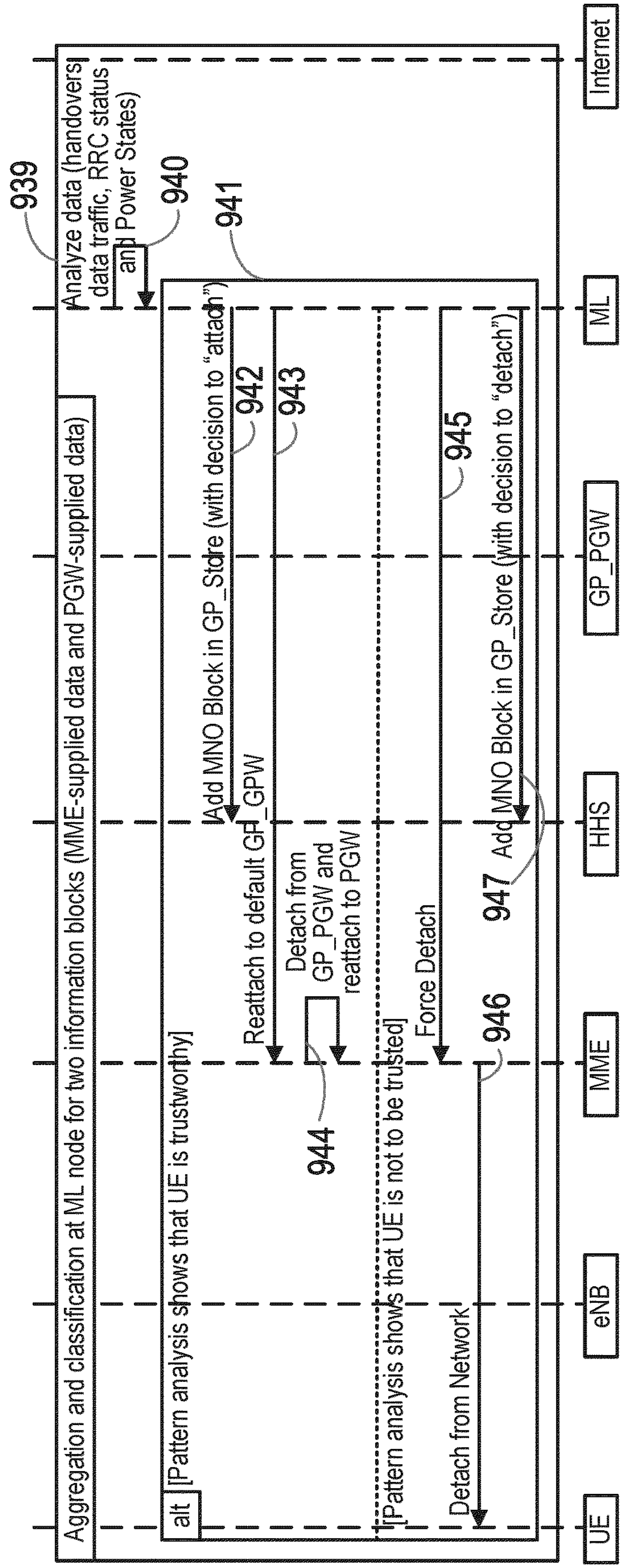

The signalling diagram in FIG. 8 illustrates an exemplary process for enabling a wireless device without an IMSI to attach to a communication network 104 in accordance with various exemplary embodiments, and the signalling diagram in FIG. 9 illustrates an exemplary process for collecting and analysing behaviour information in accordance with various exemplary embodiments. Both signalling diagrams illustrate the techniques in a 4G network (LTE), but it will be appreciated that the processes are similar in 3G (UMTS) and 5G (NR) networks.

In particular, FIG. 8 is a signalling diagram illustrating exemplary signalling between a wireless device (UE) 801 and a communication network 104 comprising a base station (eNB) 803, a mobility management node (MME) 805 and a subscriber information storage node (HSS) 807. The UE 801 does not have an IMSI for the communication network 104/MNO.

In step 811 an RRC Connection Request/Setup procedure is performed by the UE 801 and the eNB 803. This procedure is performed in a conventional manner.

In the next stage of the process the unique device identifier of the UE 801 is acquired by the communication network (stage 812). This stage comprises the UE 801 sending an attach request 813 to the eNB 803 (e.g. a "RRC Connection Setup Complete Attach Request"). The attach request 813 includes the unique device identifier (DSN) of the UE 801, and may also include an indication of the UE network capability, and requests attachment of the UE 801 to the communication network.

The eNB 803 sends an attach request 814 to the MME 805. The attach request 814 includes the DSN of the UE 801, and may also include the indication of the UE network capability.

In the next stage (stage 815) of the process authentication of the UE 801 is attempted. This stage comprises the MME 805 sending a request 816 for authentication information to the HSS 807. The request 816 can be an Authentication Information Request. The request 816 includes the unique device identifier (DSN) received by the MME in request 814.

The HSS 807 may query its local store 117 using the DSN provided by the MME 807 to determine if authentication information is available for the UE 801 (this step is not shown in FIG. 8). As the UE 801 is not yet subscribed to the communication network, this query will not identify any suitable authentication information. Therefore, the HSS 807 queries its local copy of the distributed ledger 700 (GP_Store 124 using the DSN to determine if information is available for the UE 801 (this step is not shown in FIG. 8).

In sub-stage 817, if the distributed ledger 700 (particularly the first layer 701) does not include any wireless device information for a wireless device having the indicated DSN, then the HSS 807 returns an authentication failure message 818 to the MME 805 indicating that the DSN has not been found in the distributed ledger 700. The MME 805 subsequently sends an attach failure message 819 to the UE 801 indicating that the attach request 813 is rejected or failed.

Alternatively in sub-stage 817, if the distributed ledger 700 (particularly the first layer 701) does include information for a wireless device having the indicated DSN, then the HSS 807 returns an authentication match message 820 to the MME 805 indicating that information for a wireless device having the indicated DSN is present in the distributed ledger 700. The message 820 can also include the private key for the UE 801 that is stored in the Private Key field 716. The MME 805 then requests the HSS 807 provide any indication of an authentication decision relating to the UE 801 having the provided DSN that is stored in the distributed ledger 700. This is shown by 'Fetch' message 821. The HSS 807 queries the distributed ledger 700 (particularly the second layer 702) to obtain any information stored in the second layer 702 for the UE 801. This querying is not shown in FIG. 8. The HSS 807 returns to the MME 805 any blocks for the UE 801 in the MNO layer 702, as shown by message 822. It will be appreciated that in alternative implementations, the information in message 822 can also be provided with the positive indication in message 820, thereby avoiding the need for the MME 805 to send separate request 821.

The MME 805 evaluates (step 823) the received blocks from the second layer 702 to determine if a decision has been made in respect of the UE 801. In particular, the MME 805 can evaluate the indication provided in the "Decision" field 751 in each received block.

If the evaluation indicates that the UE 801 has been blocked or blacklisted, or the UE 801 has been rejected more than a threshold number of times, then the MME 805 may, in sub-stage 824, send an attach failure message 825 to the UE 801 indicating that the attach request 813 is rejected or failed.

If the evaluation does not indicate that the UE 801 has been blocked or blacklisted, then the MME 805 initiates a normal mutual authentication procedure 826 using the private encryption key received in message 820. That is, the MME 805 encrypts a random challenge using the private key of the UE 801 and sends the encrypted challenge to the UE 801. The UE 801 decrypts the encrypted challenge using its locally stored copy of the private key and sends the decrypted challenge back to the MME 805. If the decrypted challenge is correct, then this part of the initial attach process is considered successful and the UE 801 is permitted to attach to the network for a limited time period (the grace period).

The MME 805 then performs a location update procedure 827 in which the MME 805 sends an update location request 828 to the HSS 807. The update location request 828 requests the HSS 807 provide an address (e.g. an IP address) of a PGW that the UE 801 can use. This request 828 can include the unique device identifier (DSN) and an identifier for the MME 805 (MMEID). The HSS 807 responds with an update location response 829 that includes one or more of the DSN, an APN to use during the grace period (GP APN), the PGW the UE 801 should use during the grace period (e.g. GP-PGW 122), and a QoS Class Identifier (QCI). The QCI (QoS values) for the grace period may be 'best effort'.

The MME 805 stores this information (step 830) and a session is established (stage 832) for the UE 801 using the specified GP-PGW 122. The session is established in the conventional way, and the UE 801 is able to start making and receiving calls, and sending and receiving messages and/or data.

The signalling diagram in FIG. 9 illustrates an exemplary process for collecting and analysing behaviour information in accordance with various exemplary embodiments.

In particular, FIG. 9 is a signalling diagram illustrating exemplary signalling between a wireless device (UE) 901 and a communication network 104 comprising a base station (eNB) 903, a mobility management node (MME) 905, a subscriber information storage node (HSS) 807, a packet gateway (GP-PGW) 809, an analysis node 911 and an external network (e.g. the Internet) 913. The process in FIG. 9 is a continuation of the process shown in FIG. 8. Thus, the UE 801 does not have an IMSI for the communication network 104/MNO, and the UE 901 has been permitted to attach to the communication network 104 on the basis of a unique device identifier (e.g. DSN) for a defined time period (grace period) via a separate PGW, GP-PGW 909. This is represented in FIG. 9 by step 921.

The behaviour information collection phase comprises two main stages, information collected and provided by the MME 905 (stage 922) and information collected and provided by the GP-PGW 909 (stage 923). One or both of stages 922 and 923 may be performed for a particular UE 901.

The information collected and provided by the MME 905 in stage 922 can include information relating to any of handovers, RRC status and RRC Power States of the UE 901. Sub-block 924 shows how information relating to handovers can be obtained. Briefly, the MME 905 is aware of handovers between cells by the UE 901 (as shown by process 925), and can store this information. Sub-block 926 shows information gathering for an X2 Handover and an S1 handover in more detail.

For the X2 Handover, there will be handover signalling 927 between the UE 901 and eNB 903, including any of an RRC measurement report, a handover request, RRC Connection Reconfiguration and SN Status transfer messages and RRC Connection Reconfiguration Complete messages. The eNB 903 will send a path switch request 928 to the MME 905 indicating the DSN of the UE 901, and the source cell and target cell for the handover. There will be other messages to complete the X2 handover (shown by process 929), but following request 928 the MME 905 is aware of the handover.

For the S1 Handover, there will be handover signalling 930 between the UE 901 and MME 905, including an indication that a handover is required, the DSN of the UE 901, and the source cell and target cell for the handover. There will be other messages to complete the S1 handover (shown by process 931), but following message 930 the MME 905 is aware of the handover.

Process 932 indicates that standardised processes exist in 3GPP networks for enabling an MME 905 to determine an RRC status of the UE and RRC Power State.

The MME 905 sends the collected behaviour information to the analysis node 911, as shown by message 933. This message 933 can include information such as the DSN, a list of handovers (e.g. the time that each handover occurred), a list of RRC power states with corresponding time information (e.g. timestamps), and a list of RRC statuses with corresponding time information (e.g. timestamps). Alternatively, or in addition, the MME 905 may send the information in message 933 to the HSS 907 where it can be added to a block in the second layer 702 of the distributed ledger 700.

The information collected and provided by the GP-PGW 909 in stage 923 can include information about the data traffic, and in particular, uplink data traffic from the UE 901 to an external network 913. Thus, the UE 901 generates and sends a data packet 934 that includes one or more headers and a payload to the eNB 903. The eNB 903 forwards (935) the data packet through the SGW (not shown in FIG. 9) to the GP-PGW 909.

The GP-PGW 909 can use deep packet inspection (DPI) to identify the UE 901 from the packet header(s) (e.g. by determining the DSN of the UE 901), and/or inspect the data payload itself. This is shown as step 936. The GP-PGW 909 then sends the information about the data packet to the analysis node 911 (message 937). Alternatively, or in addition, the GP-PGW 909 may send the information about the data packet to the HSS 907 where it can be added to a block in the second layer 702 of the distributed ledger 700.

The GP-PGW 909 also routes the data packet to the indicated destination in the external network 913 (indicated by message 938).

In the next stage 939 the analysis node 911 evaluates the available behaviour information for the UE 901 to determine if the UE 901 belongs to a particular third party (enterprise). Thus, in step 940 the analysis node 911 analyses the behaviour information received in message 933 and/or message 938 (depending on which have been received). This analysis can comprise identifying a pattern to the UE's behaviour during the grace period based on the received behaviour information.

In embodiments where blocks in the first layer 701 of the distributed ledger 700 include the Model Endpoint field 722, step 940 can comprise the analysis node 911 obtaining the latest behaviour models from all enterprises for all UEs 901 according to the indicated endpoints (e.g. websites, URLs). The analysis node 911 can evaluate the UE's behaviour in the grace period against the obtained models to determine if the UE's behaviour is consistent with any of those models. In particular the analysis node 911 can apply the behaviour information for the UE 901 to the behaviour model(s) to determine whether the UE 901 is owned by one of the enterprises.

In alternative embodiments where behaviour models from the enterprises are not available or not used, the analysis node 911 can use machine learning techniques to evaluate the behaviour of the UE 901. For example, in some embodiments a reinforcement learning approach can be used in order to train a model to detect which enterprise a UE exhibiting certain behaviour/data traffic characteristics belongs to. In alternative embodiments an artificial neural network (ANN) can be trained and used to detect which enterprise a UE exhibiting certain behaviour/data traffic characteristics belongs to.

Next, stage 941 relates to the operations when the UE 901 is found to be owned by a particular enterprise (which means that the UE 901 is deemed to be trusted), or not owned by any particular enterprise (which means that the UE 901 is not to be trusted). Stage 941 can be performed once enough behaviour information has been obtained for the UE 901 to enable the analysis node 911 to a reliable enough decision on the owner of the UE 901, and/or stage 941 can be performed at the end of the grace period.

If the analysis node 911 determines in step 940 that the UE 901 is to be trusted, the analysis node 911 sends an 'add request' 942 to the HSS 907 that indicates that the UE 901 is to be allowed to attach to the communication network 104 and that includes the grace period behaviour information for the UE 901 evaluated by the analysis node 911. The HSS 907 adds this information to the second layer 702 that includes the behaviour information in the Grace Period Patterns field 749 and the decision 'attach' to the Decision field 751 in the block. This information can be added as a new block to the second layer 702. The analysis node 911 also sends a reattach message 943 to the MME 905 that instructs the MME 905 to reattach the UE 901 to the communication network via the regular PGW 120 in the communication network 104. After receiving the reattach message 943, the MME 905 detaches the UE 901 from the GP-PGW 909, reattaches the UE 901 to the regular PGW 120 (step 944) and re-establishes the session (e.g. EPS bearer).

If the analysis node 911 determines in step 940 that the UE 901 is not to be trusted, the analysis node 911 sends a force detach message 945 to the MME 905 that instructs the MME 905 to detach the UE 901 from the communication network 104. After receiving the force detach message 945, the MME 905 detaches the UE 901 from the communication network 104 (via detach message 946). The analysis node 911 also sends an 'add block' request 947 to the HSS 907 that indicates that the UE 901 is not to be allowed to attach to the communication network 104 and that includes the grace period behaviour information for the UE 901 evaluated by the analysis node 911. The HSS 907 adds a new block to the second layer 702 that includes the behaviour information in the Grace Period Patterns field 749 and the decision 'detach' to the Decision field 751 in the block.

The process of packet analysis 923 in FIG. 9 can be ongoing and repeated for information for every incoming data packet received from the GP-PGW 909. As noted above, the process involves the already existing Deep Packet Inspection (DPI) component of a PGW finding out to which DSN the packet belongs to, and subsequently the analysis node 911 storing the data packet in an internal buffer. When sufficient behaviour samples are collected for a UE with a specific DSN, then behaviour models can be executed in order to find out whether the DSN belongs to a specific enterprise.

As an alternative approach to steps 943 and 944, on determining that the UE 901 can be trusted, the grace period timer for that UE 901 can be frozen or stopped, and the UE 901 is permitted to continue operating using the session established with the GP-PGW 909. When that UE 901 subsequently reattaches to the network, step 823 of FIG. 8 will result in the 'attach' decision being identified, and the UE 901 will reattach to the communication network 104 via the normal PGW 120.

While the above packet inspection process has been applied to uplink data packets, it will be appreciated that that the same process can also or alternatively be applied to downlink data packets.

As noted above, the analysis node 911 can apply the obtained behaviour information to a behaviour model provided by the enterprise to determine if the UE 901 belongs to that enterprise. Alternatively, the analysis node 911 can use ML techniques to identify the owner of the UE 901. One example is reinforcement learning (RL). In RL, an 'agent' interacts with an 'environment' by applying actions towards it and obtaining rewards as feedback for each of these actions. In the present case, the "environment" is the enterprise customers, and the "agent" is the analysis node 911. In the first step, which is during a training phase for the analysis node 911, the environment provides the agent with a traffic pattern. This traffic pattern may be sample behaviour information for UEs of a particular enterprise. The agent classifies the pattern into one of a plurality of classes (where the classes here are the different possible customers) and sends the classified result as an action back to the environment. If the classification is correct, the environment rewards the agent, e.g. by sending "1", and if not, it sends "0". In addition, the environment sends the next state, i.e. the next traffic pattern. Over time, the agent becomes more robust and reliable at classifying traffic patterns correctly. At this point the training process stops, and the analysis node 911 can be used as shown in FIG. 9.

It should be noted that in the case of RL, it is assumed that a training period predates a period where the analysis node 911 is in use. In this training period, all relevant enterprise customers must participate in order to provide rewards to classifications by the analysis node 911. In addition, a number of UEs generating realistic user-plane data traffic must participate, e.g. at least one UE for every enterprise customer.

Another example of a ML technique that can be used is artificial neural networks (ANNs), as this allows a relation between the inputs and the outputs of the given data that models the behaviour between the UE and the communication network to be specified. An ANN is a directed computation graph, where the nodes are computation units and the edges describe the connection pattern among the nodes. Each node receives as input a weighted sum of activations flowed through the edges, applies an activation function and releases the output via the edges to other nodes. In fully connected ANNs, there exists a connection between every two nodes in the adjacent layers. When applied to the problem of classifying a UE to an enterprise customer, the input vector for the ANN can include any of the following parameters: mobility (in terms of which cells the UE handovers from/to during the grace period), throughput volume (e.g. data rate) and messaging timeline, and destination of data packets. The output of the ANN will be the unique label of the enterprise customers, along with a degree of confidence for the output.

Figure 10:
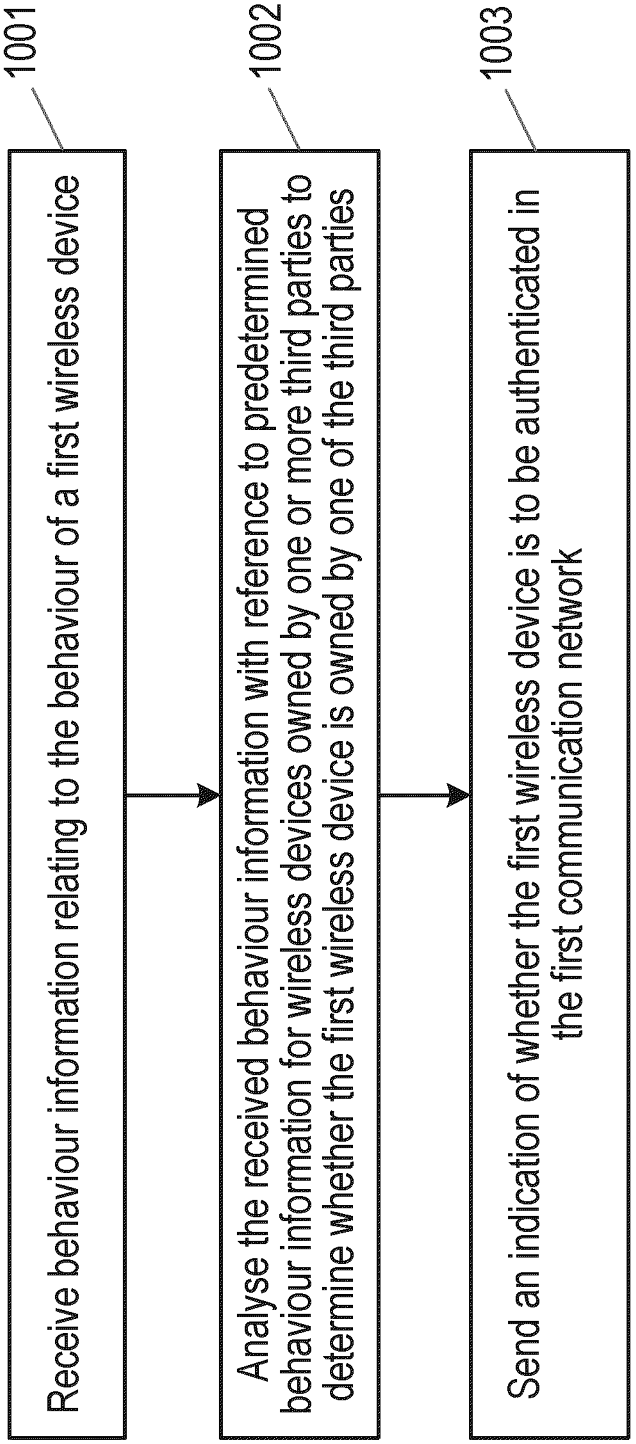
FIG. 10 is a flow chart illustrating an exemplary method of operating an analysis node according to general embodiments.

The flow chart in FIG. 10 illustrates an exemplary method of operating an analysis node according to the techniques described herein.

In step 1001, the analysis node receives behaviour information from a network node in a first communication network to which a first wireless device is attached. The behaviour information relates to the behaviour of the first wireless device with respect to the first communication network during a time period following attachment of the first wireless device to the first communication network. The network node that the behaviour information is received from can be one of a mobility management node (e.g. a MME 905) and a first packet gateway (e.g. PGW) that the first wireless device is attached to. In some embodiments, in step 1001 the analysis node can receive behaviour information from both of the mobility management node and the first packet gateway.

The behaviour information can relate to any one or more of: throughput or data rate, handovers, durations of attachment to cells in the communication network, a transmission power of the wireless device, RRC states of the wireless device, content of and/or destination for, data packets sent by the wireless device, content of and/or origin of, data packets sent to the wireless device.

In step 1002, the analysis node analyses the received behaviour information for the first wireless device. In this step the analysis node analyses the behaviour information with reference to predetermined behaviour information for wireless devices owned by one or more third parties (e.g. enterprises) to determine whether the first wireless device is owned by one of these third parties.

In step 1003, the analysis node sends an indication of whether the first wireless device is to be authenticated in the first communication network to a network node in the communication network. The indication is based on whether the first wireless device is determined in step 1002 to be owned by one of the third parties. The indication can be sent to a mobility management node in the first communication network.

In some embodiments, if in step 1002 the first wireless device is determined to be owned by one of the third parties, the indication sent in step 1003 can indicate that the first wireless device is to be reattached to a different packet gateway in the first communication network. In these embodiments, if in step 1002 the first wireless device is not determined to be owned by one of the third parties, then the indication sent in step 1003 can indicate that the first wireless device is to be detached from the first communication network.

In some embodiments, the analysis node sends an add request to the subscriber information storage node. The add request comprises information that is to be stored by the subscriber information storage node in a first distributed ledger. The information in the add request comprises one or both of the received behaviour information, and the indication of whether the first wireless device is to be authenticated in the first communication network. If the first wireless device is determined in step 1002 to be owned by one of the third parties, the information in the add request may comprise an indication that the first wireless device is to be attached to the first communication network. If the first wireless device is not determined to be owned by one of the third parties in step 1002 the information in the add request may comprise an indication that the first wireless device is to be detached from the first communication network.

In some embodiments, prior to step 1002, the method can comprise obtaining behaviour models for the one or more third parties. A behaviour model for a particular third party provides information on behaviour expected for wireless device that is owned by that third party. In these embodiments, step 1002 can comprise applying the received behaviour information to the behaviour models to determine whether the first wireless device is owned by one of the third parties.

In some embodiments, the step of obtaining behaviour models can comprise obtaining a behaviour model for a particular third party from an address (e.g. Model Endpoint field 722) provided by the subscriber information storage node.

In alternative embodiments, the step of obtaining behaviour models can be performed prior to step 1001, for example during a training phase for the analysis node. In these embodiments, the behaviour models can be obtained as follows. First, behaviour information relating to behaviour of a plurality of wireless devices with respect to the first communication network and/or another communication network can be received. Owner information identifying one or more third parties that own the plurality of wireless devices can also be received. The received behaviour information for the plurality of wireless devices and the received owner information can be analysed to determine the behaviour models for the one or more third parties.

In some embodiments, the received behaviour information and the received owner information can be analysed using a RL technique to determine the behaviour models. This RL technique can comprise using a RL model to classify the received behaviour information for one of the plurality of wireless devices as belonging to a particular one of the third parties, receiving a reward relating to the accuracy of the classification, updating the RL model based on the received reward, and repeating this technique for received behaviour information for another one of the plurality of wireless devices. This results in the RL model being further updated and behaviour models for the one or more third parties being determined.

In alternative embodiments, the received behaviour information and the received owner information can be analysed using an ANN technique to determine the behaviour models. This ANN technique can comprise forming an initial ANN that receives behaviour information for a wireless device as a vector input and that outputs an identity of a third party that owns the wireless device and a degree of confidence in the output identity. Next, the initial ANN is trained using the received behaviour information and the received owner information to determine a trained ANN.

Figure 11:
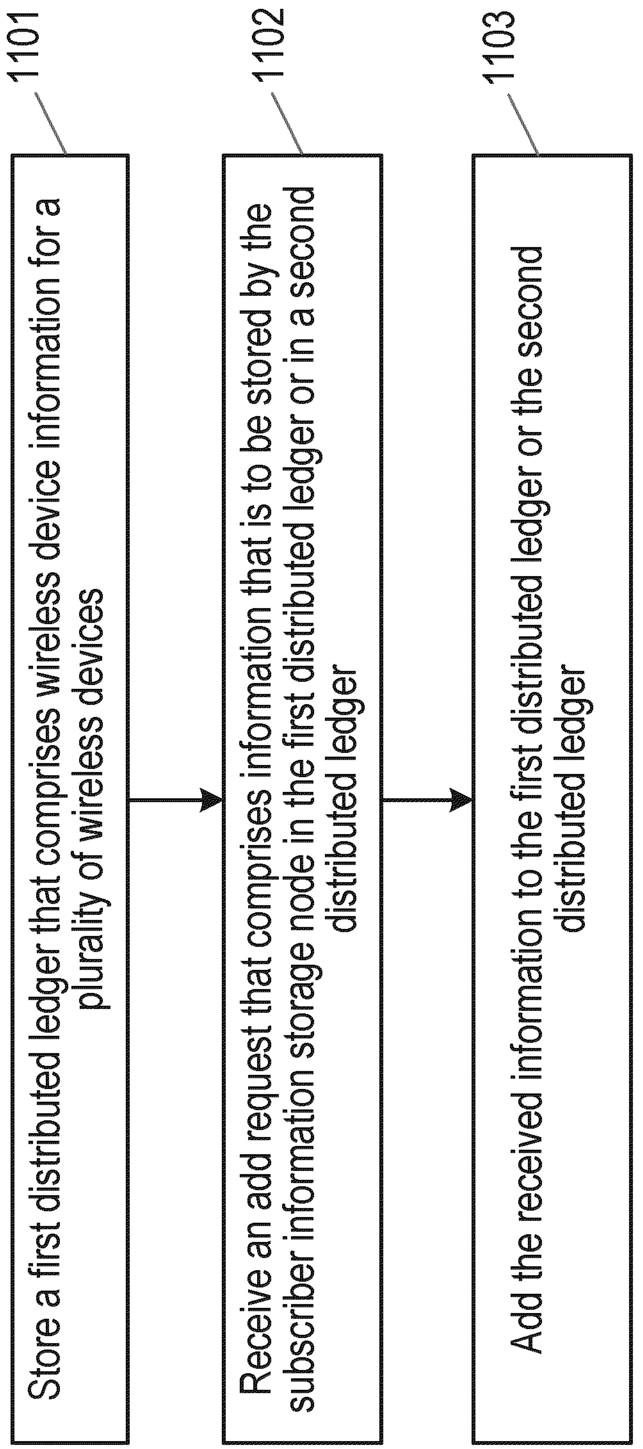
FIG. 11 is a flow chart illustrating an exemplary method of operating a subscriber information storage node according to general embodiments.

The flow chart in FIG. 11 illustrates an exemplary method of operating a subscriber information storage node according to the techniques described herein.

In step 1101, the subscriber information storage node store a first distributed ledger that comprises wireless device information for a plurality of wireless devices. The wireless device information comprises respective unique device identifiers (e.g. a DSN, VIN or IMEI) and authentication information for the plurality of wireless devices. The authentication information for the plurality of wireless devices may comprise respective private encryption keys. In some embodiments the wireless device information further comprises one or more of: one or more addresses at which respective behaviour models for the plurality of wireless devices are stored; and information identifying one or more third parties that own the plurality of wireless devices.

In step 1102, the subscriber information storage node receives an add request that comprises information that is to be stored by the subscriber information storage node in the first distributed ledger or in a second distributed ledger. The add request is received from an analysis node. The information in the add request comprises one or both of behaviour information for a first wireless device in a time period following attachment to the first communication network, and an indication of whether the first wireless device is to be authenticated in the first communication network.

The indication of whether the first wireless device is to be authenticated in the first communication network can comprise one of: an indication that the first wireless device is to be attached to the first communication network as the analysis node has determined that the first wireless device is owned by one of the third parties; and an indication that the first wireless device is to be detached from the first communication network as the analysis node has determined that the first wireless device is not owned by one of the third parties.

In some embodiments, the behaviour information relates to any one or more of: throughput or data rate, handovers, durations of attachment to cells in the communication network, a transmission power of the wireless device, RRC states of the wireless device, content of and/or destination for, data packets sent by the wireless device, content of and/or origin of, data packets sent to the wireless device.

In step 1103, the subscriber information storage node adds the information received from the analysis node to the first distributed ledger or the second distributed ledger.

In some embodiments, the method can comprise further steps between steps 1101 and 1102. These steps can comprise receiving an authentication information request for a first wireless device having a first unique device identifier from a mobility management node in the first communication network. The authentication information request requests authentication information for the first wireless device. The subscriber information storage node can query the first distributed ledger using the first unique device identifier. If authentication information is present in the first distributed ledger for a wireless device having the first unique device identifier, the subscriber information storage node can send an authentication information response to the mobility management node comprising the retrieved authentication information for the first wireless device. In these embodiments, the unique device identifier can be a DSN, a VIN or an IMEI. In some embodiments, the authentication information response can comprise one of: a private encryption key for the first wireless device; an indication that a wireless device having that unique device identifier is not known; and an indication that a wireless device having that unique device identifier is not permitted to attach to the first communication network. In some embodiments, the authentication information response can indicate that the first wireless device having the unique device identifier does not have an associated unique subscriber identity or an IMSI. In some embodiments, the method further comprises receiving an update location request (including the unique device identifier of the first wireless device) for the first wireless device from the mobility management node. In response to receiving the update location request, the subscriber information storage node may send an update location response to the mobility management node, the update location response indicating an address for a first packet gateway node in the first communication network to be used for user data traffic for the first wireless device during the time period. The update location response may further comprise a predefined APN for use by the first wireless device.

In some embodiments, the method may further comprise the subscriber information storage node receiving further wireless device information for a further plurality of wireless devices. The further wireless device information may be received from a third party, and the further wireless device information may comprise respective unique device identifiers and authentication information for the further plurality of wireless devices. The subscriber information storage node can store the further wireless device information in the first distributed ledger.

Figure 12:
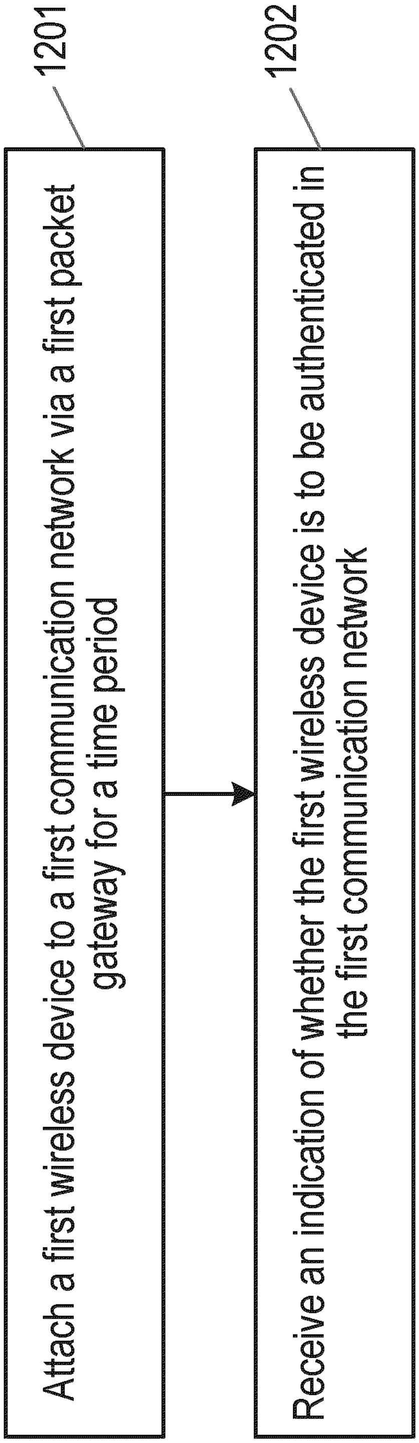
FIG. 12 is a flow chart illustrating an exemplary method of operating a mobility management node according to general embodiments.

The flow chart in FIG. 12 illustrates an exemplary method of operating a mobility management node according to the techniques described herein.

In step 1201, the mobility management node attaches a first wireless device to the first communication network via a first packet gateway in the first communication network. This attachment is for a time period (the grace period).

In step 1202, the mobility management node receives an indication of whether the first wireless device is to be authenticated in the first communication network. This indication is received from an analysis node and indicates either that the first wireless device is to be reattached to a different packet gateway in the first communication network or the first wireless device is to be detached from the first communication network.

In some embodiments, the method comprises further steps between step 1201 and 1202. For example, the method can further comprise sending behaviour information to the analysis node. The behaviour information relates to the behaviour of the first wireless device with respect to the first communication network during the time period following attachment of the first wireless device to the first communication network via the first packet gateway. In these embodiments, the behaviour information can relate to any one or more of: handovers, durations of attachment to cells in the communication network, a transmission power of the wireless device, and RRC states of the wireless device.

In some embodiments, step 1201 can comprise several sub-steps. Firstly, the mobility management node can receive an attach request for the first wireless device. The attach request comprises a unique device identifier of the first wireless device (e.g. a DSN, VIN, IMEI, etc.) and requests attachment for the first wireless device to the first communication network. Next, the mobility management node sends an authentication information request for the first wireless device to a subscriber information storage node in the first communication network. The authentication information request requests authentication information for the first wireless device and comprises the unique device identifier for the first wireless device. The mobility management node receives an authentication information response from the subscriber information storage node. In some embodiments, the received authentication information response can indicate that the first wireless device having the unique device identifier does not have an associated unique subscriber identity, such as an IMSI. The received authentication information response may comprise a private encryption key for the first wireless device. The mobility management node then attaches the first wireless device to the first communication network via the first packet gateway based on the received authentication information response. In embodiments where the authentication information response comprises a private encryption key for the first wireless device, step 1201 can comprise initiating an attach procedure for the first wireless device in which a challenge message encrypted with the received private encryption key is sent to the first wireless device, and attaching the first wireless device to the first communication network based on a response to the challenge message received from the first wireless device. In some embodiments, step 1201 can further comprise the mobility management node sending an update location request for the first wireless device to the subscriber information storage node. The update location request can comprise the unique device identifier for the first wireless device. An update location response can be received from the subscriber information storage node in response to the update location request. The update location response can indicate an address for the first packet gateway that is to be used for user data traffic for the first wireless device. The update location response may also comprise a predefined APN for use by the first wireless device.

In some embodiments, the method (or step 1201) comprises establishing a first data session for the first wireless device via the first packet gateway.

As described herein, an apparatus, device, virtual apparatus or virtual device can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. An analysis node, comprising:

processing circuitry; and memory coupled to the processing circuitry and having instructions stored therein that are executable by the processing circuitry to cause the analysis node to perform operations comprising:

receiving from a network node in a first communication network to which a first wireless device is attached, behavior information relating to the behavior of the first wireless device with respect to the first communication network during a time period following attachment of the first wireless device to the first communication network, the behavior information relating to any one or more of: throughput or data rate, handovers, durations of attachment to cells in the communication network, a transmission power of the wireless device, Radio Resource Control (RRC) states of the wireless device, content of and/or destination for, data packets sent by the wireless device, content of and/or origin of, data packets sent to the wireless device;

determining whether the first wireless device is owned by a third party based on the behavior information and predetermined behavior information for wireless devices owned by the third party; and transmitting to the network node in the communication network, an indication of whether the first wireless device is to be authenticated in the first communication network based on whether the first wireless device is determined to be owned by the third party.

2. The analysis node of claim 1, wherein the indication indicates that the first wireless device is to be reattached to a different packet gateway in the first communication network if the first wireless device is determined to be owned by one of the third parties, and the indication indicates that the first wireless device is to be detached from the first communication network if the first wireless device is not determined to be owned by one of the third parties.

3. The analysis node of claim 1, the operations further comprising:

transmitting, to a subscriber information storage node in the first communication network, an add request that comprises information that is to be stored by the subscriber information storage node in a first distributed ledger, wherein the information in the add request comprises one or both of the received behavior information, and the indication of whether the first wireless device is to be authenticated in the first communication network, wherein the information in the add request comprises an indication that the first wireless device is to be attached to the first communication network if the first wireless device is determined to be owned by one of the third parties, and the information in the add request comprises an indication that the first wireless device is to be detached from the first communication network if the first wireless device is not determined to be owned by one of the third parties.

4. The analysis node of claim 1, wherein receiving the behavior information comprises receiving the behavior information from one of a mobility management node and a first packet gateway that the first wireless device is attached to, and wherein the analysis node is operative to receive behavior information from both of the mobility management node and the first packet gateway.

5. The analysis node of claim 1, the operations further comprising:

obtaining behavior models for the one or more third parties including obtaining a behavior model for a particular third party from an address provided by a subscriber information storage node in the first communication network, the behavior model for the particular third party providing information on behavior expected for wireless device that is owned by that third party; and determining whether the first wireless device is owned by one of the third parties by applying the received behavior information to the behavior models.

6. The analysis node of claim 5, the operations further comprising:

obtaining behavior models prior to receiving behavior information relating to the behavior of the first wireless device by:

receiving behavior information relating to behavior of a plurality of wireless devices with respect to the first communication network and/or another communication network;

receiving owner information identifying one or more third parties that own the plurality of wireless devices; and determining the behavior models for the one or more third parties by analyzing the received behavior information for the plurality of wireless devices and the received owner information; and determining the behavior models by:

(i) using a reinforcement learning (RL) model to classify the received behavior information for one of the plurality of wireless devices as belonging to a particular one of the third parties;

(ii) receiving a reward relating to the accuracy of the classification;

(iii) updating the RL model based on the received reward;

(iv) repeating operations (i)-(iii) for received behavior information for another one of the plurality of wireless devices to further update the RL model and determine the behavior models for the one or more third parties.

7. The analysis node of claim 6, the operations further comprising:

determining the behavior models by:

forming an initial artificial neural network (ANN) that receives behavior information for a wireless device as a vector input and that outputs an identity of a third party that owns the wireless device and a degree of confidence in the output identity; and training the initial ANN using the received behavior information and the received owner information to determine a trained ANN.

8. The analysis node of claim 1, wherein the indication of whether the first wireless device is to be authenticated in the first communication network is sent to a mobility management node in the first communication network.

9. The analysis node of claim 1, wherein the first wireless device does not have an International Mobile Subscriber Identity (IMSI).

10. A subscriber information storage node for use in a first communication network, the subscriber information storage node comprising:

processing circuitry; and memory coupled to the processing circuitry and having instructions stored therein that are executable by the processing circuitry to cause the subscriber information storage node to perform operations comprising:

storing a first distributed ledger that comprises wireless device information for a plurality of wireless devices, wherein the wireless device information comprises respective unique device identifiers and authentication information for the plurality of wireless devices;

receiving from an analysis node, an add request that comprises information that is to be stored by the subscriber information storage node in the first distributed ledger or in a second distributed ledger, wherein the information in the add request comprises one or both of behavior information for a first wireless device in a time period following attachment to the first communication network, and an indication of whether the first wireless device is to be authenticated in the first communication network; and adding the information received from the analysis node to the first distributed ledger or the second distributed ledger.

11. The subscriber information storage node of claim 10, wherein the wireless device information further comprises one or more of: one or more addresses at which respective behavior models for the plurality of wireless devices are stored; and information identifying one or more third parties that own the plurality of wireless devices.

12. The subscriber information storage node of claim 10, the operations further comprising:

receiving, from a mobility management node in the first communication network, an authentication information request for a first wireless device having a first unique device identifier, the authentication information request requesting authentication information for the first wireless device;

querying the first distributed ledger using the first unique device identifier; and responsive to the authentication information being present in the first distributed ledger for a wireless device having the first unique device identifier, transmitting, to the mobility management node, an authentication information response comprising the retrieved authentication information for the first wireless device, wherein the unique device identifier is a device serial number, a vehicle identification number (VIN) or an International Mobile Equipment Identity (IMEI).

13. The subscriber information storage node of claim 12, wherein the authentication information response comprises one of:

a private encryption key for the first wireless device;

an indication that a wireless device having that unique device identifier is not known; and an indication that a wireless device having that unique device identifier is not permitted to attach to the first communication network.

14. The subscriber information storage node of claim 12, the operations further comprising:

receiving an update location request for the first wireless device from the mobility management node, wherein the update location request comprises the unique device identifier for the first wireless device, and wherein the update location response further comprises a predefined access point name, APN, for use by the first wireless device.

15. The subscriber information storage node of claim 10, wherein the authentication information for the plurality of wireless devices comprises private encryption keys, the operations further comprising:

receiving, from a third party, further wireless device information for a further plurality of wireless devices, wherein the further wireless device information comprises respective unique device identifiers and authentication information for the further plurality of wireless devices; and storing the further wireless device information in the first distributed ledger.

16. A mobility management node for use in a first communication network, the mobility management node comprising:

processing circuitry; and memory coupled to the processing circuitry and having instructions stored therein that are executable by the processing circuitry to cause the mobility management node to perform operations comprising:

transmitting to a subscriber information storage node in the first communication network, a request for authentication information for a first wireless device, including a unique device identifier for the first wireless device;

receiving authentication information from the subscriber information storage node indicating that the first wireless device does not have an associated unique subscriber identity;

attaching the first wireless device to the first communication network via a first packet gateway in the first communication network for a time period based on the authentication information; and receiving, from an analysis node, an indication of whether the first wireless device is to be authenticated in the first communication network, wherein the indication indicates either that the first wireless device is to be reattached to a different packet gateway in the first communication network or the first wireless device is to be detached from the first communication network.

17. The mobility management node of claim 16, the operations further comprising:

transmitting, to the analysis node, behavior information relating to the behavior of the first wireless device with respect to the first communication network during the time period following attachment of the first wireless device to the first communication network via the first packet gateway.

18. The mobility management node of claim 16, wherein attaching the first wireless device to the first communication network comprises:

receiving, via a first base station in the first communication network, an attach request for the first wireless device, wherein the attach request comprises a unique device identifier of the first wireless device and requests attachment for the first wireless device to the first communication network, wherein the unique subscriber identity is an International Mobile Subscriber Identity (IMSI).

19. The mobility management node of claim 18, wherein the received authentication information response comprises a private encryption key for the first wireless device, and wherein attaching the first wireless device to the first communication network comprises:

initiating, via the first base station, an attach procedure for the first wireless device in which a challenge message encrypted with the received private encryption key is sent to the first wireless device; and based on a response to the challenge message received from the first wireless device, attaching the first wireless device to the first communication network, the operations further comprising:

transmitting an update location request for the first wireless device to the subscriber information storage node, wherein the update location request comprises the unique device identifier for the first wireless device; and receiving an update location response from the subscriber information storage node, the update location response indicating an address for the first packet gateway that is to be used for user data traffic for the first wireless device.

20. The mobility management node of claim 16, the operations further comprising:

establishing a first data session for the first wireless device via the first packet gateway.

* * * * *